(12) United States Patent
Hirosawa et al.

(10) Patent No.: US 9,546,671 B2
(45) Date of Patent: *Jan. 17, 2017

(54) PRESSURE EXCHANGE DEVICE

(71) Applicant: Kubota Corporation, Osaka-shi (JP)

(72) Inventors: Yoshifumi Hirosawa, Amagasaki (JP); Norihiro Teramoto, Amagasaki (JP); Akira Shouzaki, Amagasaki (JP); Kazuto Komatsu, Amagasaki (JP)

(73) Assignee: Kubota Corporation, Osaka-shi (JP)

( * ) Notice: Subject to any disclaimer, the term of this patent is extended or adjusted under 35 U.S.C. 154(b) by 23 days.

This patent is subject to a terminal disclaimer.

(21) Appl. No.: 14/346,566

(22) PCT Filed: Sep. 25, 2012

(86) PCT No.: PCT/JP2012/074495
§ 371 (c)(1),
(2) Date: Mar. 21, 2014

(87) PCT Pub. No.: WO2013/047487
PCT Pub. Date: Apr. 4, 2013

(65) Prior Publication Data
US 2015/0050167 A1      Feb. 19, 2015

(30) Foreign Application Priority Data

Sep. 30, 2011   (JP) .................................. 2011-217221
Mar. 27, 2012   (JP) .................................. 2012-072210

(51) Int. Cl.
*F04F 13/00*      (2009.01)
*B01D 61/06*      (2006.01)
(Continued)

(52) U.S. Cl.
CPC .............. *F04F 13/00* (2013.01); *B01D 61/06* (2013.01); *B01D 2313/246* (2013.01);
(Continued)

(58) Field of Classification Search
CPC ... B01D 61/08; B01D 61/10; B01D 2313/246; B01D 61/06; F04F 13/00
See application file for complete search history.

(56) References Cited

U.S. PATENT DOCUMENTS 1,515,101 A      11/1924   Fowler
2,759,660 A *    8/1956    Jendrassik .............. F04F 13/00
                                                                    417/64
(Continued)

FOREIGN PATENT DOCUMENTS

CN   200710056401      1/2009
GB          872211     7/1961
(Continued)

*Primary Examiner* — Bryan Lettman
(74) *Attorney, Agent, or Firm* — The Webb Law Firm

(57) ABSTRACT

A pressure exchange device is equipped with a rotator, for which first flow paths through which a first fluid flows in and out and second flow paths through which a second fluid flows in and out are arranged around a shaft center so as to penetrate through in the direction of the rotation axis. The device includes a first lateral member with a first fluid inflow path, a second fluid outflow path, a second fluid inflow path, and a first fluid outflow path. The device also includes a second lateral member with communication sections that connect the first flow paths and the second flow paths and exchange pressure between the first fluid and the second fluid.

25 Claims, 27 Drawing Sheets

(51) Int. Cl.
  *C02F 1/44* (2006.01)
  *C02F 103/08* (2006.01)
(52) U.S. Cl.
  CPC .......... *C02F 1/441* (2013.01); *C02F 2103/08* (2013.01); *C02F 2303/10* (2013.01); *Y02W 10/30* (2015.05)

(56) References Cited

U.S. PATENT DOCUMENTS

| | | | |
|---|---|---|---|
| 2,764,340 A * | 9/1956 | Boszormenyi et al. | 417/64 |
| 6,540,487 B2 | 4/2003 | Polizos et al. | |
| 6,659,731 B1 * | 12/2003 | Hauge | F15B 3/00 |
| | | | 417/64 |
| 7,306,437 B2 | 12/2007 | Hauge | |
| 2007/0212231 A1 * | 9/2007 | Bross et al. | 417/65 |
| 2009/0180903 A1 * | 7/2009 | Martin | F04F 13/00 |
| | | | 417/405 |
| 2013/0294944 A1 * | 11/2013 | Hirosawa et al. | 417/53 |
| 2015/0050167 A1 * | 2/2015 | Hirosawa et al. | 417/406 |

FOREIGN PATENT DOCUMENTS

| | | |
|---|---|---|
| WO | 9917028 A1 | 4/1999 |
| WO | 2009046429 A2 | 4/2009 |
| WO | 2012096253 A1 | 7/2012 |

* cited by examiner

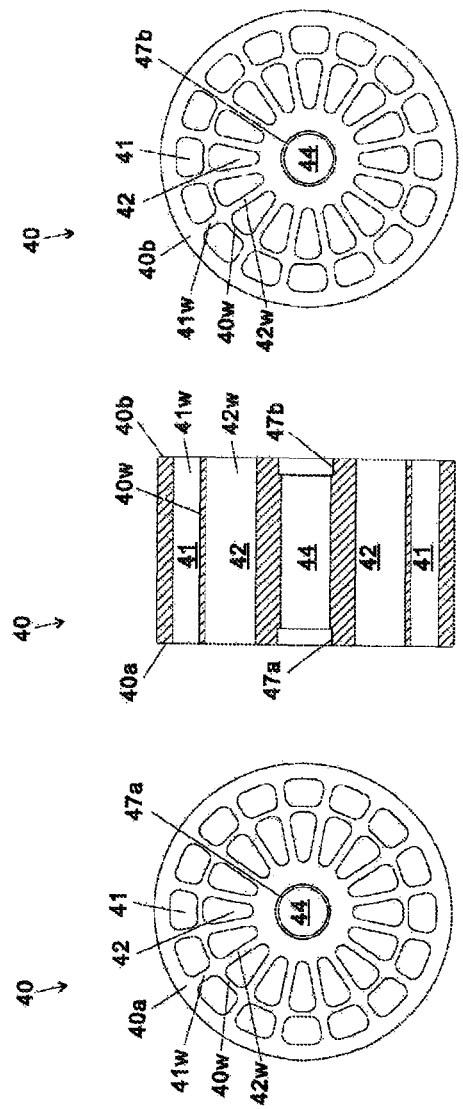

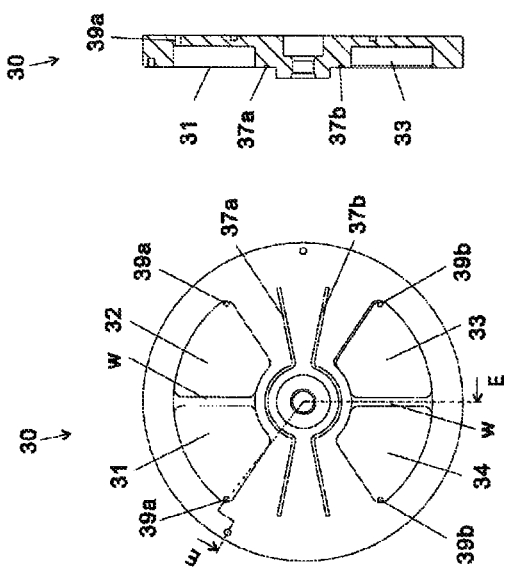

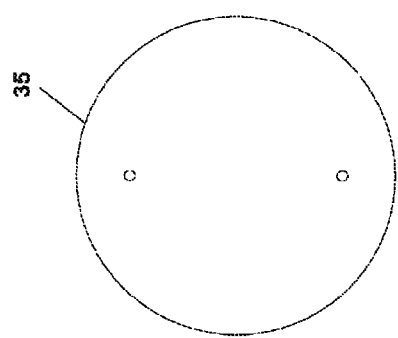
Fig.8C
Fig.8B
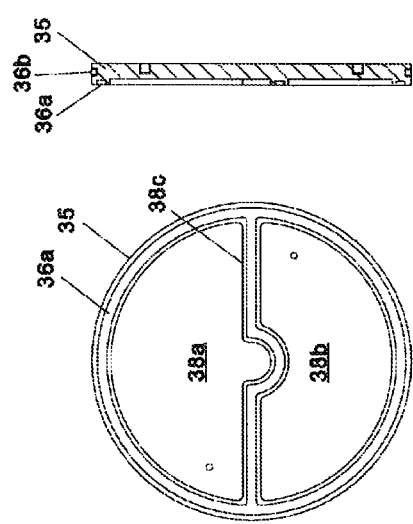
Fig.8A

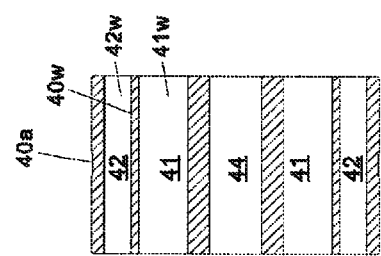
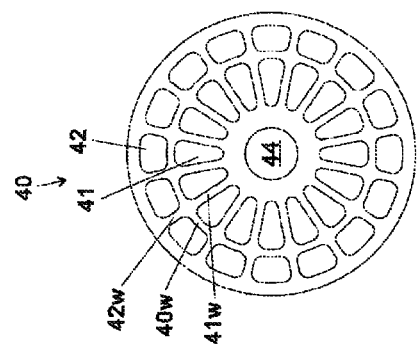
Fig.11B
Fig.11A

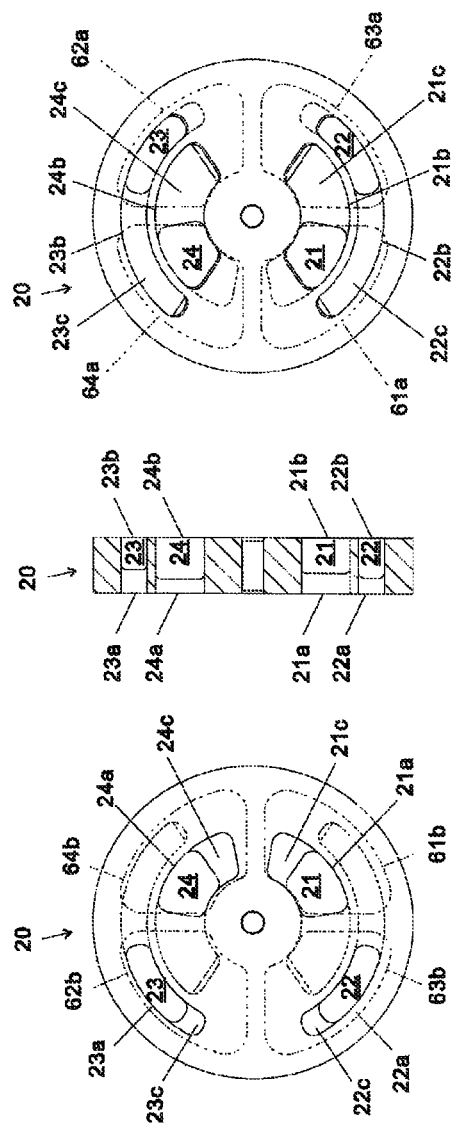

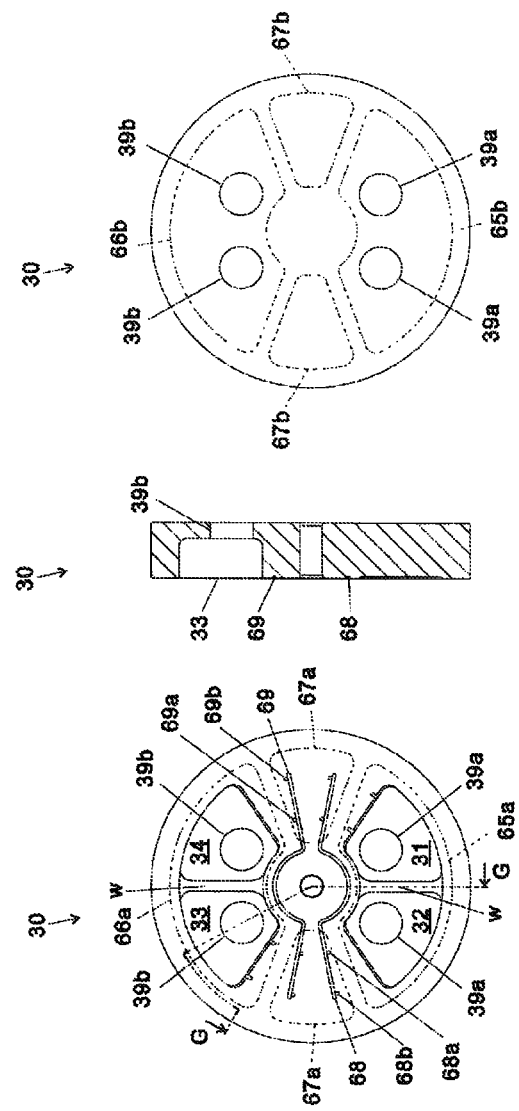

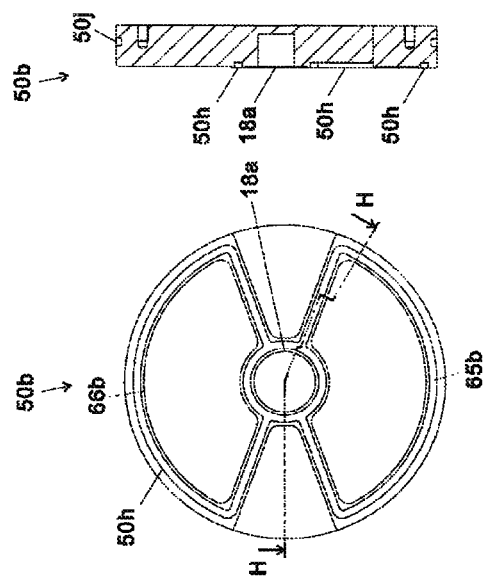

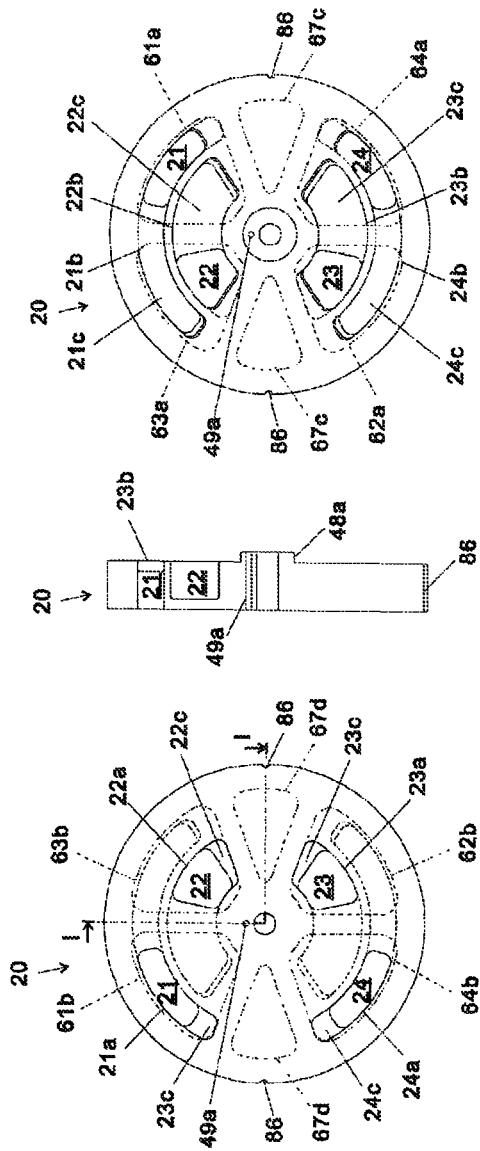

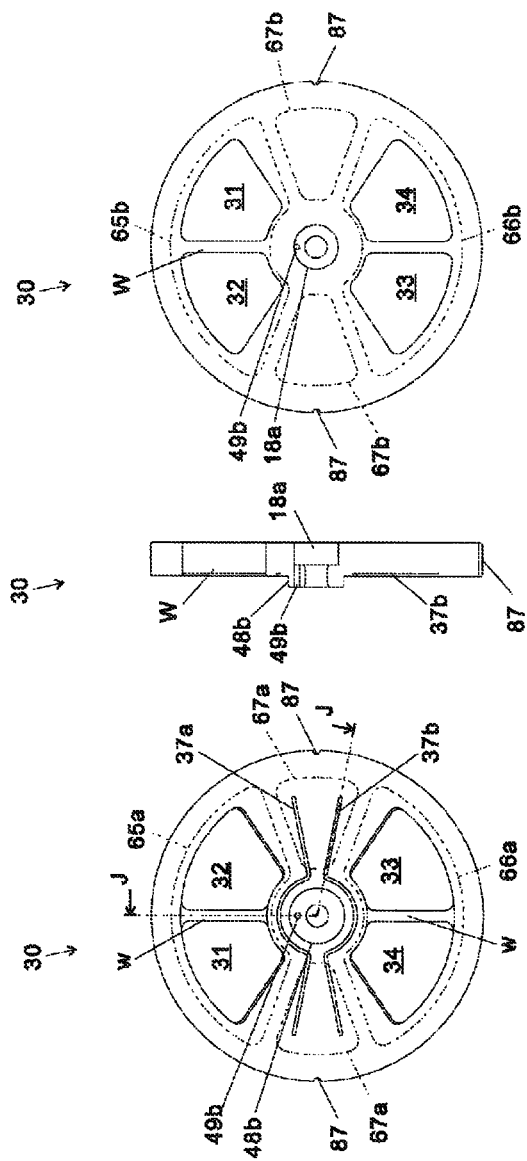

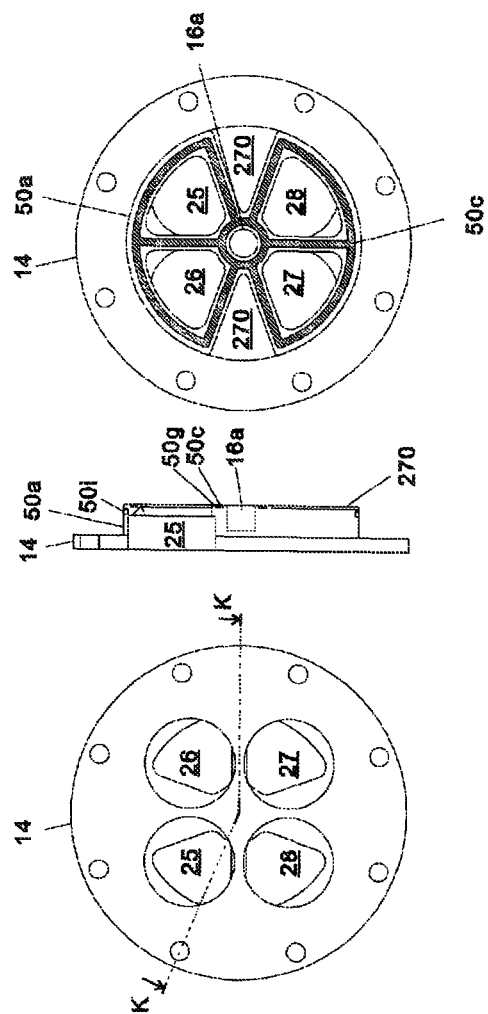

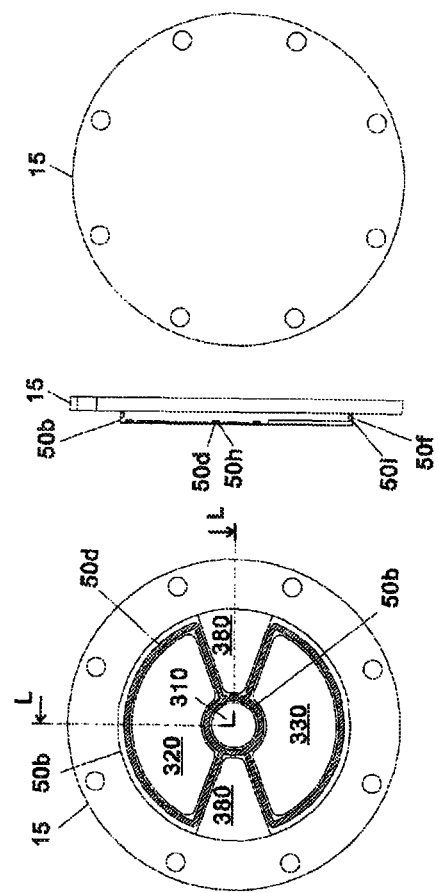

PRESSURE EXCHANGE DEVICE

CROSS-REFERENCE TO RELATED APPLICATIONS

This application is the United States national phase of International Application No. PCT/JP2012/074495 filed Sep. 25, 2012, and claims priority to Japanese Patent Application Nos. 2011-217221 filed Sep. 30, 2011 and 2012-072210 filed Mar. 27, 2012, the disclosures of which are hereby incorporated in their entirety by reference.

TECHNICAL FIELD

The present invention relates to a pressure exchange device that exchanges pressure between a first fluid and a second fluid.

BACKGROUND ART

In a seawater desalination facility which uses a reverse osmosis membrane device, there is provided a pressure exchange device that utilizes the pressure of high pressure concentrated seawater, which is a high pressure concentrated fluid discharged from the reverse osmosis membrane device, for raising the pressure of low pressure seawater, which is a concentration target fluid supplied to the reverse osmosis membrane device.

As is illustrated in FIG. 25, in Patent Document 1, a pressure exchange device is described that includes a rotor 80 in which a plurality of tubular pressure transmission units are provided around a rotation axis.

The pressure exchange device is configured to allow the high pressure concentrated seawater supplied to a high pressure inlet side port 82 and the low pressure seawater supplied to a low pressure inlet side port 81 to be brought into contact with each other in a pressure transmission unit with the rotation of the rotor 80, discharge the low pressure seawater, whose pressure is raised by the pressure of the high pressure concentrated seawater, from a high pressure outlet side port 83 as the high pressure seawater, and discharge the low pressure concentrated seawater, in which the transmission of the pressure has been completed by means of the low pressure seawater supplied to the low pressure inlet side port 81, from a low pressure outlet side port 84.

As is illustrated in FIG. 26, in Patent Document 2, a pressure exchange device is described that includes a rotator 90 constituted by a pair of rotational plates 91 and 92 and an axis 93 contiguous with the rotational plates 91 and 92.

In one rotational plate 91, there are formed a flow path 91a that guides the low pressure seawater supplied to a low pressure inlet side port 95 to a pressure transmission unit 96, and a flow path 91b that guides the high pressure seawater discharged from the pressure transmission unit 96 to a high pressure outlet side port 97.

In the other rotational plate 92, there are formed a flow path 92b that guides the high pressure concentrated seawater supplied to the high pressure inlet side port 94 to the pressure transmission unit 96, and a flow path 92a that guides the low pressure concentrated seawater discharged from the pressure transmission unit 96 to a low pressure outlet side port 98.

The pressure exchange device is configured to allow the high pressure concentrated seawater supplied to the high pressure inlet side port 94 and the low pressure seawater supplied to the low pressure inlet side port 95 to be brought into contact with each other in the tubular pressure transmission unit 96 with the rotation of the rotator 90, discharge the low pressure seawater, whose pressure is raised by the pressure of the high pressure concentrated seawater, from the high pressure outlet side port 97 as the high pressure seawater, and discharge the low pressure concentrated seawater, in which the transmission of the pressure has been completed by means of the low pressure seawater supplied to the low pressure inlet side port 95, from the low pressure outlet side port 98.

PRIOR ART DOCUMENTS

Patent Documents

[Patent Document 1] US2009180903(A1)
[Patent Document 2] CN200710056401

SUMMARY OF INVENTION

Problems to be Solved by the Invention

In the pressure exchange device described in Patent Document 1, a treatment flow rate, at which pressure is transmitted dependent on the cross-sectional area of the tubular pressure transmission unit disposed in the rotor 80, is determined. Accordingly, it is necessary to increase the number of pressure transmission units or expand the cross-sectional area of each pressure transmission unit, in order to increase the treatment flow rate. In any case, the rotor 80 increases in size, which leads to an increase in the size and weight of the pressure exchange device.

Generally, conditions such as weight reduction, high rigidity, abrasion resistance property, and a low friction coefficient are a prerequisite for the rotor 80, which is formed of expensive materials such as ceramics. Accordingly, there is a problem in that material costs and manufacturing costs mount up due to the increase in the size of the pressure exchange device.

Furthermore, there is a problem in that torque required to rotate a large-size rotor 80 is increased, which requires large energy, compared with a case where a small-size rotor 80 is rotated, and reduces the efficiency. For this reason, it is extremely difficult to increase the treatment flow rate per one unit of pressure exchange device.

Accordingly, in large-size seawater desalination facilities that process the desalination for a large volume of seawater, a multitude of pressure exchange devices are installed. However, there is a problem in that, when the number of pressure exchange devices installed increases, the execution and management of the pipes that connect each pressure exchange device are complicated.

In the pressure exchange device described in Patent Document 2, the flow path 91b formed in the one rotational plate 91 and the flow path 92b formed in the other rotational plate 92 are respectively constituted in such a manner that a flow path along the axial direction and a flow path formed in the circumferential direction are communicated in the interior of the rotator, so that a thickness needs to be provided for the formation of the flow paths in the rotational plates 91 and 92. Accordingly, there is a problem in that the rotational plates 91 and 92 increase in size, which leads to an increase in material costs and machining costs.

Furthermore, when the weight increases due to the increase in the size of the rotational plates 91 and 92, stress acted on the axis portion 93 at the time of rotation of the rotator 90 increases in response to a twist or bending.

Consequently, there is a problem in that not only it is necessary to make the axis portion 93 thick in order to prevent deformation and breakdown, but also energy required for rotation increases, and the efficiency is reduced.

Accordingly, as is described below, the inventors of the present application study an efficient pressure exchange device that enables downsizing and reduction in costs without reducing the treatment flow rate. As is illustrated in FIGS. 27A and 27B, a pressure exchange device 10 includes a rotator 40 in which a pressure transmission unit, which is formed in such a manner as to communicate between a first flow path 41 through which a first fluid flows into or out from one end side and a second flow path 42 through which a second fluid flows into or out from the one end side, is disposed around the rotation axis.

Furthermore, there is included a first lateral member 20 in which a first fluid inflow path 21 that guides the first fluid to the first flow path 41, a second fluid outflow path 22 that guides the second fluid, whose pressure has been exchanged for the pressure of the first fluid, from the second flow path 42, a second fluid inflow path 23 that guides the second fluid to the second flow path 42, and a first fluid outflow path 24 that guides the first fluid, whose pressure has been exchanged for the pressure of the second fluid, from the first flow path 41 are formed in the thickness direction, and a second lateral member 30 that rotatably sandwiches the rotator 40 between the first lateral member 20 and the second lateral member 30 via a retentive member 11.

According to the pressure exchange device 10, the pressure transmission unit is constituted by the first flow path 41, the second flow path 42, and a communication section of both flow paths, so that the first fluid or the second fluid flows into the pressure transmission unit from one end side of the rotator 40, whereby pressure is exchanged between the first fluid and the second fluid, and the second fluid or the first fluid can be flown out from the one end side.

Accordingly, compared with the pressure transmission unit constituted by the straight pipes described in Patent Document 1, when the pressure exchange processing is applied with the same amount of fluid, the length of the axial direction of the rotator is shortened, thereby achieving the downsizing and the reduction of costs of the device. Also, even when it is necessary to increase the flow rate in the pressure exchange processing, the length in the axial direction of the rotator is shortened, so that an extreme increase in size of the device can be avoided.

However, there is an apprehension that, when a high pressure fluid flows between the first flow path 41 and the second flow path 42 via the communication section, large stress acts on a partition 41$w$ between the first flow paths 41 or a partition 42$w$ between the second flow paths 42, and each of the partitions is adjacently formed in the circumferential direction of the rotator 40, which causes the damage of the partitions 41$w$ and 42$w$.

Accordingly, it is conceivable that the partitions 41$w$ and 42$w$ are formed in such a manner as to increase their thickness so as to secure sufficient strength. However, an increase of the thickness of the partitions 41$w$ and 42$w$ limits the treatment flow rate or the downsizing.

In view of the above-described problems, it is an object of the present invention to provide an efficient pressure exchange device that enables further downsizing and reduction of costs without reducing a treatment flow rate.

Means for Solving the Problems

In order to achieve the above-described object, the first characteristic constitution of a pressure exchange device of the present invention is a pressure exchange device configured to exchange pressure between a first fluid and a second fluid which includes a rotator in which a first flow path, through which the first fluid flows in and out from one end side, and a second flow path, through which the second fluid flows in and out from the one end side, are arranged around a rotation axis in such a manner as to penetrate in the rotation axis direction, a first lateral member in which a first fluid inflow path configured to guide the first fluid to the first flow path, a second fluid outflow path configured to guide the second fluid, whose pressure has been exchanged for pressure of the first fluid, from the second flow path, a second fluid inflow path configured to guide the second fluid to the second flow path, and a first fluid outflow path configured to guide the first fluid, whose pressure has been exchanged for pressure of the second fluid, from the first flow path, are formed in a thickness direction, and a second lateral member in which there is formed a communication section configured to communicate with the first flow path and the second flow path and exchange pressure between the first fluid and the second fluid, and wherein the rotator is rotatably sandwiched between the first lateral member and the second lateral member.

According to the above-described constitution, the first fluid flown into the first flow path and the second fluid flown into the second flow path from the one end side of the rotator are brought into contact with each other via the communication section formed in the second lateral member provided on the other end side of the rotator with the rotation of the rotator and flow out from the one end side of the rotator after pressure exchange.

Accordingly, when the pressure exchange processing is applied with the same amount of fluid, it can be configured to shorten the length of the axial direction of the rotator, thereby achieving the downsizing and the reduction of costs of the device, compared with the pressure transmission unit constituted by the straight pipes described in Patent Document 1. Also, even when the cross-sectional area of the flow paths formed in the rotator is expanded in order to increase the treatment flow rate of pressure exchange, the length in the axial direction of the rotator can be shortened, so that an extreme increase in size of the device can be avoided.

Also, the first fluid inflow path and the first fluid outflow path, and the second fluid inflow path and the second fluid outflow path are formed only in the first lateral member, so that each pipe that connects the inflow path or the outflow path of each fluid only need to be arranged en masse on the first lateral member side.

Accordingly, a compact installation space inclusive of the pipes is provided, and the workability in terms of the installation operation and maintenance work of the each pipe and the like can be improved, compared with a conventional device in which each pipe connecting with the fluid inflow path or the fluid outflow path formed in the rotator needs to be arranged on the bilateral sides of the rotator.

Furthermore, a flow path wall 40$w$ (see FIG. 3A) formed between the first flow path 41 and the second flow path 42 exists over the entire length of the rotator in the axial direction, so that the pressure applied to the partition 41$w$ between the first flow paths 41 (see FIG. 3A) and the partition 42$w$ between the second flow paths 42 (see FIG. 3A), which are adjacently formed in the circumferential direction of the rotator, can be supported with the flow path wall 40$w$ between the first flow path 41 and the second flow path 42.

Accordingly, unlike the pressure transmission device illustrated in FIGS. 27A and B, there is no apprehension that, when a high pressure fluid flows between the first flow path 41 and the second flow path 42 via the communication section formed in the rotator, large stress acts on the partition 41w between the first flow paths 41 or the partition 42w between the second flow paths 42, which causes damage of the partitions 41w and 42w. Consequently, even when the partitions 41w between the first flow paths 41 and the partition 42w between the second flow paths 42 are formed in such a manner as not to increase their thickness, sufficient strength can be secured, and further downsizing and reduction in costs can be achieved without reducing the treatment flow rate.

In addition to the first characteristic constitution described above, the second characteristic constitution of the pressure exchange device of the present invention is such that a retentive member configured to cover the rotator is provided between the first lateral member and the second lateral member, and a gap that each fluid enters is formed between the rotator and the first lateral member, and the second lateral member.

With the above-described constitution, the rotator rotates in a space that is partitioned by the first lateral member, the second lateral member, and the retentive member, so that the pressure exchange processing is successively performed wherein the second fluid, whose pressure is transmitted from the first fluid that flows from the first fluid inflow path into the first flow paths 41, flows out from the second flow paths 42 into the second fluid outflow path, and the first fluid, whose pressure is transmitted from the second fluid that flows from the second fluid inflow path into the second flow paths 42, flows out from the first flow paths 41 into the first fluid outflow path.

In this case, the rotator is pressed toward the second lateral member by the first fluid or the second fluid that enters the gap between the rotator and the first lateral member, and the rotator is pressed toward the first lateral member by the first fluid or the second fluid that enters the gap between the rotator and the second lateral member. As a result, the rotator is pressed with an approximately equivalent force on the bilateral sides along the axial direction, so that pressure balance is maintained without leaning to one side of any of the first lateral member and the second lateral member.

Moreover, the fluid that enters each gap functions as lubricant, so that the rotator is prevented from sliding with the first lateral member or the second lateral member, which allows the rotator to stably, smoothly rotate. Furthermore, the fluid that enters the gap between the rotator and the retentive member functions as lubricant, so that the rotator can be prevented from sliding on the inner circumferential surface of the retentive member and stably, smoothly be rotated.

As a result, the abrasion between the rotator and the first lateral member, the second lateral member, and the retentive member can be reduced, and durability can be improved without the use of expensive abrasion resistance materials. Furthermore, even when it is configured to form a large diameter of the rotator and expand the cross-sectional areas of the first flow path 41 and the second flow path 42 in order to increase the treatment flow rate, the rotator rotates stably and smoothly, so that the energy required to rotationally drive the rotator is suppressed low. It is noted that, when each gap is too narrow, a great sliding resistance occurs, and when each gap is too large, the leakage of the fluid increases, which reduces the efficiency of the pressure exchange. Preferably, each gap is set to about 1 to 100 μm.

In addition to the first or second characteristic constitution described above, the third characteristic constitution of the pressure exchange device of the present invention is such that there is provided a press mechanism configured to press at least one of the first lateral member or the second lateral member and adjust an interval between the first lateral member and the second lateral member.

With the above-described constitution, even when the gap is extended due to the abrasion attributed to the sliding between the rotator and the first lateral member or the second lateral member, and the leakage of the fluid into the gap increases, and the efficiency of the pressure exchange is reduced, the press mechanism presses at least one of the first lateral member or the second lateral member, thereby adjusting the gap between the first lateral member and the second lateral member. Accordingly, this enables the steady operation for a long period of time without carrying out large-scale maintenance involved with disassembly such as component replacement.

In addition to the third characteristic constitution described above, the fourth characteristic constitution of the pressure exchange device of the present invention is such that the press mechanism is constituted by a first end cover and a second end cover that are respectively arranged on an end surface side, which is different from facing surfaces of the first lateral member and the second lateral member with respect to the rotator, and a coupling member configured to fasten the first end cover to the second end cover.

With the above-described constitution, the first end cover and the second end cover are respectively arranged on the end surface side on the opposite side of the end surface opposite to the rotator, regarding a pair of end surfaces of the first and second lateral members, and the pressure of the fluid, which enters the gap between the first and second lateral members and the rotator, is applied to the first and second lateral members and received by each end cover. Then, the degree of fastening of the coupling member that fastens the first end cover and the second end cover is adjusted, whereby respective gaps between the rotator and the first lateral member, and the second lateral member can be adjusted to a favorable value, and the smooth rotation of the rotator can be maintained.

In addition to the fourth characteristic constitution described above, the fifth characteristic constitution of the pressure exchange device of the present invention is such that there are provided a first enclosed space configured to be partitioned at least by the first lateral member and the first end cover, a first communication path configured to be formed in the first end cover in such a manner as to guide the first fluid or the second fluid to the first enclosed space, a second enclosed space configured to be partitioned at least by the second lateral member and the second end cover, and a second communication path configured to be formed in the second lateral member in such a manner as to guide the first fluid or the second fluid to the second enclosed space.

The pressure is applied to the first lateral member in the external direction separating from the rotator, by means of the first fluid or the second fluid that enters the gap between the rotator and the first lateral member, and in particular, large pressure is applied to the first lateral member facing the first enclosed space. However, the first fluid or the second fluid is guided from the first communication path formed in the first end cover to the first enclosed space, so that the pressure balance is maintained on the bilateral surfaces of the first lateral member facing the first enclosed space. As a result, even when the thickness of the first lateral member is reduced, the first lateral member is prevented from being warped in the rotation axis direction by the pressure of the fluid, thereby maintaining the smooth rotation of the rotator.

Similarly, the pressure is applied to the second lateral member in the external direction separating from the rotator, by means of the first fluid or the second fluid that enters the gap between the rotator and the second lateral member, and in particular, large pressure is applied to the second lateral member facing the second enclosed space. However, the first fluid or the second fluid is guided from the second communication path formed in the second end cover to the second enclosed space, so that the pressure balance is maintained on the bilateral surfaces of the second lateral member facing the second enclosed space. As a result, even when the thickness of the second lateral member is reduced, the second lateral member is prevented from being warped in the rotation axis direction by the pressure of the fluid, thereby maintaining the smooth rotation of the rotator.

In addition to the fifth characteristic constitution described above, the sixth characteristic constitution of the pressure exchange device of the present invention is such that there are provided a tubular casing configured to store the retentive member, an outer circumferential enclosed space configured to be partitioned by the first lateral member, the second lateral member, an outer circumferential surface of the retentive member, and an inner circumferential surface of the casing, and a third communication path configured to be formed in the retentive member, through which the gap between the rotator and the retentive member, and the outer circumferential enclosed space are allowed to communicate.

With the above-described constitution, the fluid, which enters the gap between the outer circumferential surface of the rotator and the inner circumferential surface of the retentive member via the gap between the rotator and the first lateral member, and the second lateral member, enters the outer circumferential enclosed space between the outer circumferential surface of the retentive member and the inner circumferential surface of the casing via the third communication path formed in the retentive member.

The pressure of the fluid that is guided to the outer circumferential enclosed space is equalized with the pressure of the fluid that is applied to the gap between the outer circumferential surface of the rotator and the inner circumferential surface of the retentive member, so that, even the thickness of the retentive member is reduced, the retentive member is prevented from being warped in the radial direction. As a result, the gap between the rotator and the retentive member is kept to a favorable value without fluctuation during operation, so that smooth rotation of the rotator can be maintained.

In addition to the fifth or sixth characteristic constitution described above, the seventh characteristic constitution of the pressure exchange device of the present invention is such that there is provided a support shaft whose bilateral ends are supported by the first lateral member and the second lateral member, and wherein a shaft portion configured to be penetrated by the support shaft and configured to rotatably support the rotator at bilateral end portions of the rotator is integrally formed with the first lateral member and the second lateral member in such a manner as to protrude on respective facing surface sides of the first lateral member and the second lateral member with respect to the rotator.

The rotator is rotatably supported by shaft portions that are formed in such a manner as to protrude on the rotator side in the first lateral member and the second lateral member, and a state is maintained where the rotator is rotatably sandwiched between the first lateral member and the second lateral member by the support shaft that penetrates the shaft portions.

In addition to any of the first to seventh characteristic constitutions described above, the eighth characteristic constitution of the pressure exchange device of the present invention is such that a cross-sectional area of the first flow path 41 and a cross-sectional area of the second flow path 42 are formed to be approximately equal.

With the above-described constitution, the cross-sectional area of the first flow path 41 and the cross-sectional area of the second flow path 42 are formed to be approximately equal, so that a pressure loss in a case where the fluid flows through the first flow path 41 and the second flow path 42 can be reduced, and the efficient pressure transmission can be achieved.

In addition to any of the first to eighth characteristic constitutions described above, the ninth characteristic constitution of the pressure exchange device of the present invention is such that the first lateral member includes a torque application mechanism configured to apply torque to the rotator based on energy of the first fluid that flows into the first flow path 41 or flows out from the first flow path 41, or energy of the second fluid that flows into the second flow path 42 or flows out from the second flow path 42.

With the above-described constitution, the energy of the first fluid that flows into the first flow path 41 or flows out from the first flow path 41 or the energy of the second fluid that flows into the second flow path 42 or flows out from the second flow path 42 is converted into torque that allows the rotator to rotate, by means of the torque application mechanism provided in the first lateral member. Accordingly, the rotator can be rotated based on the energy of the fluid that is targeted for pressure conversion, without the addition of external motive power. Then, the inflow and outflow of the first fluid and the inflow and outflow of the second fluid into the pressure transmission unit can be switched with the rotation of the rotator, so that a separate switching mechanism for flow paths is eliminated.

In addition to the first characteristic constitution described above, the tenth characteristic constitution of the pressure exchange device of the present invention is such that a gap that each fluid enters is formed between the rotator and the first lateral member, and the second lateral member, and the retentive member to cover the rotator is provided between the first lateral member and the second lateral member, and wherein a bearing portion configured to rotatably support the rotator with an inner circumferential surface of the retentive member and an outer circumferential surface of the rotator is constituted.

When shaft portions that support the bilateral ends of the rotator on the rotation axis are formed in the first lateral member and the second lateral member, and when the accuracy of dimension of the left and right shaft portions cannot be obtained, there is an apprehension that the shaft center and the rotation axis of the rotator are tilted, and the smooth rotation is hindered. However, according to the above-described bearing portions, the outer circumferential cross section of the rotator and the inner circumferential cross section of the retentive member, which are orthogonal to the rotation axis, are formed in a circle, so that the shaft center and the rotation axis of the rotator are not tilted, and the rotator smoothly rotates while the outer circumferential surface of the rotator is supported by the inner circumferential surface of the retentive member. In this time, each fluid, which advances through the gap formed between the rotator and the first lateral member, and the second lateral member, enters the gap between the inner circumferential surface of the retentive member and the outer circumferential surface of the rotator and functions as lubricant, thereby suppressing the sliding between the inner circumferential surface of the retentive member and the outer circumferential surface of the rotator.

In addition to the tenth characteristic constitution described above, the eleventh characteristic constitution of the pressure exchange device of the present invention is such that a first end cover and a second end cover are arranged on an end surface side, which is different from facing surfaces of the first lateral member and the second lateral member with respect to the rotator, and wherein a support shaft is inserted in an insertion portion formed and penetrated through a central portion of the rotator along the rotation axis, and each end portion of the support shaft is respectively provided in a first enclosed space partitioned by the first lateral member and the first end cover, and in a second enclosed space partitioned by the second lateral member and the second end cover and, wherein there are formed a fourth communication path configured to communicate with the first enclosed space and the insertion portion and a fifth communication path configured to communicate with the second enclosed space and the insertion portion.

The fluid that enters the insertion portion via the gap between the rotator and the first lateral member flows into the first enclosed space via the fourth communication path, and the fluid that enters the insertion portion via the gap between the rotator and the second lateral member flows into the second enclosed space via the fifth communication path, whereby approximately equal pressure is maintained in the first enclosed space, the second enclosed space, and the insertion portion.

Accordingly, in the first lateral member, the pressure balance of the bilateral surfaces is maintained in such a manner as not to generate a warp in a portion that partitions the first enclosed space, and in the second lateral member, the pressure balance of the bilateral surfaces is maintained in such a manner as not to generate a warp in a portion that partitions the second enclosed space. This constitution is adopted, whereby the thickness of the first lateral member and the second lateral member can be reduced, and the downsizing of the device and the reduction in costs can be achieved.

In addition to any of the fourth, fifth, sixth, seventh, tenth, and eleventh characteristic constitution described above, the twelfth characteristic constitution of the pressure exchange device of the present invention is such that the communication section is formed and penetrated through the second lateral member in a thickness direction, and part of the second end cover is constituted of a light transmissive member in such a manner as to enable a visual observation of the rotator through the second end cover.

At the time of a test trial, inspection, or operation for the pressure exchange device, the communication section formed and penetrated through the second lateral member in the thickness direction is visually observed through the second end cover constituted of the light transmissive member, it can be extremely easily confirmed whether or not the rotator rotates based on the movement of the flow path wall such as the first flow path 41 formed in the rotator.

In addition to any of the fourth, fifth, sixth, seventh, tenth, eleventh, and twelfth characteristic constitution described above, the thirteenth characteristic constitution of the pressure exchange device of the present invention is such that, on an end surface of the first lateral member opposite to the rotator, there are formed a first pressure area configured to receive the pressure of the first fluid supplied from the first fluid inflow path and a second pressure area configured to receive the pressure of the second fluid supplied from the second fluid inflow path, and in a facing portion of the first end cover with respect to the first lateral member, a first pressure control area is configured to be partitioned in a peripheral area of an opening portion of the first fluid inflow path and in an area approximately corresponding to the first pressure area, and a second pressure control area is configured to be partitioned in a peripheral area of an opening portion of the second fluid inflow path and in an area approximately corresponding to the second pressure area.

On the end surface of the first lateral member opposite to the rotator, there are formed the first pressure area that receives the pressure of the first fluid that advances from the first fluid inflow path and the second pressure area that receives the pressure of the second fluid that advances from the second fluid inflow path, with the rotation of the rotator. In this case, the pressure of the fluids provided in the first pressure area and the second pressure area is different, so there is an apprehension that the first lateral member is warped in the axial direction, and the efficiency of pressure exchange is reduced. However, the pressure of the first fluid is applied to the first pressure control area that is formed and partitioned in the facing portion of the first end cover to the first lateral member, and the pressure of the second fluid is applied to the second pressure control area, so that the pressure balance is maintained in the first pressure area and the first pressure control area with the first lateral member sandwiched therebetween, and the pressure balance is maintained in the second pressure area and the second pressure control area with the first lateral member sandwiched therebetween, thereby suppressing the occurrence of a warp in the axial direction of the first lateral member.

In addition to the thirteenth characteristic constitution described above, the fourteenth characteristic constitution of the pressure exchange device of the present invention is such that, on the end surface of the first lateral member opposite to the rotator, there are formed a third pressure area configured to receive the pressure of the second fluid, in which pressure has been exchanged for the pressure of the first fluid, and a fourth pressure area configured to receive the pressure of the first fluid, in which pressure has been exchanged for the pressure of the second fluid, and in the facing portion of the first end cover with respect to the first lateral member, a third pressure control area is configured to be partitioned in a peripheral area of the opening portion of the second fluid outflow path and in an area approximately corresponding to the third pressure area, and a fourth pressure control area is configured to be partitioned in a peripheral area of the opening portion of the first fluid outflow path and in an area approximately corresponding to the fourth pressure area.

On the end surface of the first lateral member opposite to the rotator, there are formed the third pressure area that receives the pressure of the second fluid after the pressure exchange and the fourth pressure area that receives the pressure of the first fluid after the pressure exchange, with the rotation of the rotator. In this time, the pressure of the fluids provided in the third pressure area and the fourth pressure area is different, so there is an apprehension that the first lateral member is warped in the axial direction, and the efficiency of pressure exchange is reduced. However, the pressure of the second fluid is applied to the third pressure control area that is formed and partitioned in the facing portion of the first end cover with respect to the first lateral member, and the pressure of the first fluid is applied to the fourth pressure control area, so that the pressure balance is maintained in the third pressure area and the third pressure control area with the first lateral member sandwiched therebetween, and the pressure balance is maintained in the fourth pressure area and the fourth pressure control area with the first lateral member sandwiched therebetween, thereby suppressing the occurrence of a warp in the axial direction of the first lateral member.

In addition to the fourteenth characteristic constitution described above, the fifteenth characteristic constitution of the pressure exchange device of the present invention is such that an intermediate pressure area is formed between the first pressure area and the third pressure area, and the second pressure area and the fourth pressure area, and in the facing portion of the first end cover with respect to the first lateral member, an intermediate pressure control area is configured to be partitioned between the first pressure control area and the third pressure control area, and the second pressure control area and the fourth pressure control area.

When the pressure of the high pressure fluid is applied to the first pressure area and the third pressure area, the pressure of the low pressure fluid is applied to the second pressure area and the fourth pressure area. Conversely, when the pressure of the low pressure fluid is applied to the first pressure area and the third pressure area, the pressure of the high pressure fluid is applied to the second pressure area and the fourth pressure area. In any cases, the high pressure fluid and the low pressure fluid are mixed in the intermediate portion in these areas, thereby forming the intermediate pressure area. In response to the intermediate pressure area, the intermediate pressure control area is partitioned between the first pressure control area and the third pressure control area, and the second pressure control area and the fourth pressure control area, thereby maintaining the pressure balance in the intermediate pressure area.

In addition to the fifteenth characteristic constitution described above, the sixteenth characteristic constitution of the pressure exchange device of the present invention is such that a sixth communication path configured to guide the fluid in the intermediate pressure area to the intermediate pressure control area is provided.

The pressure applied to the intermediate pressure area and the intermediate pressure control area is balanced by the fluid that is guided from the intermediate pressure area to the intermediate pressure control area via the sixth communication path. This sixth communication path, for example, can be constituted by a communication hole formed and penetrated through the first lateral member in the thickness direction, a communication groove formed and penetrated through the periphery of the first lateral member in the thickness direction.

In addition to any of the thirteenth to fifteenth characteristic constitution described above, the seventeenth characteristic constitution of the pressure exchange device of the present invention is such that, on an end surface of the second lateral member opposite to the rotator, there are formed a fifth pressure area configured to receive the pressure of the first fluid supplied from the first fluid inflow path and the pressure of the second fluid, in which pressure has been exchanged for the pressure of the first fluid, a sixth pressure area configured to receive the pressure of the second fluid supplied from the second fluid inflow path and the pressure of the first fluid, in which pressure has been exchanged for the pressure of the second fluid, and a seventh pressure area configured to receive intermediate pressure between the pressure of the first fluid supplied from the first fluid inflow path and the pressure of the second fluid supplied from the second fluid inflow path, between the fifth pressure area and the sixth pressure area, and in the facing portion of the second end cover with respect to the second lateral member, a fifth pressure control area is configured to be partitioned in an area approximately corresponding to the fifth pressure area, and a sixth pressure control area is configured to be partitioned in an area approximately corresponding to the sixth pressure area, and a seventh pressure control area is configured to be partitioned in an area approximately corresponding to the seventh pressure area.

On the end surface of the second lateral member opposite to the rotator, there are formed the fifth pressure area that receives the pressure of the first fluid supplied from the first fluid inflow path and the pressure of the second fluid, in which pressure has been exchanged for the pressure of the first fluid, the sixth pressure area that receives the pressure of the second fluid supplied from the second fluid inflow path and the pressure of the first fluid, in which pressure has been exchanged for the pressure of the second fluid, and the seventh pressure area that receives the intermediate pressure between the pressure of the first fluid supplied from the first fluid inflow path and the pressure of the second fluid supplied from the second fluid inflow path, between the fifth pressure area and the sixth pressure area, with the rotation of the rotator. In this case, the pressure of the fluids provided in the fifth pressure area and the sixth pressure area is different, so there is an apprehension that the second lateral member is warped in the axial direction, and the efficiency of pressure exchange is reduced. However, the balance of each pressure area and pressure control area is maintained by the pressure respectively applied to the fifth pressure control area, the sixth pressure control area, and the seventh pressure control area formed and partitioned corresponding to each pressure area in the facing portion of the second end cover with respect to the second lateral member, thereby suppressing the occurrence of a warp in the axial direction of the second lateral member.

In addition to the seventeenth characteristic constitution described above, the eighteenth characteristic constitution of the pressure exchange device of the present invention is such that a seventh communication path configured to guide the fluid in the seventh pressure area to the seventh pressure control area is provided.

The pressure applied to the seventh pressure area and the seventh pressure control area is balanced by the fluid that is guided from the seventh pressure area to the seventh pressure control area via the seventh communication path. This seventh communication path, for example, can be constituted by the communication hole formed and penetrated through the second lateral member in the thickness direction, the communication groove formed and penetrated through the periphery of the second lateral member in the thickness direction.

In addition to any of the first to eighteenth characteristic constitution described above, the nineteenth characteristic constitution of the pressure exchange device of the present invention is such that the first fluid supplied to the first fluid inflow path is a high pressure concentrated fluid discharged from a reverse osmosis membrane device, and the second fluid supplied to the second fluid inflow path is a concentration target fluid supplied to the reverse osmosis membrane device.

With the above-described constitution, the pressure of the concentration target fluid supplied to the reverse osmosis membrane device can be raised by the pressure of the high pressure concentrated fluid discharged from the reverse osmosis membrane device, so that the surplus pressure of the high pressure concentrated fluid from the reverse osmosis membrane device can be saved and utilized as effective energy.

Effects of Invention

As is described above, the present invention can provide the efficient pressure exchange device that enables the downsizing and the reduction in costs without reducing the treatment flow rate.

BRIEF DESCRIPTION OF DRAWINGS

FIG. 3A is a front view of a rotator, and FIG. 3B is a cross-sectional view of the rotator, and FIG. 3C is a rear view of the rotator.

FIG. 5A is a front view of a second lateral member, and FIG. 5B is a cross-sectional view taken along the line E-E of FIG. 5A, and FIG. 5C is a rear view of the second lateral member.

FIG. 8A is a front view of a sealing plate, and FIG. 8B is a schematic cross-sectional view of the sealing plate, and FIG. 8C is a rear view of the sealing plate.

FIG. 11A is a front view of the rotator, and FIG. 11B is a cross-sectional view of the rotator.

FIG. 13A is a front view of the first lateral member, and FIG. 13B is a cross-sectional view of the first lateral member, and FIG. 13C is a rear view of the first lateral member.

FIG. 15A is a front view of a second lateral member, and FIG. 15B is a cross-sectional view taken along the line G-G illustrated in FIG. 15A, and FIG. 15C is a rear view of the second lateral member.

FIG. 16A is a front view of a second sealing plate, and FIG. 16B is a cross-sectional view taken along the line H-H illustrated in FIG. 16A.

FIG. 18A is a front view of the first lateral member, and FIG. 18B is a cross-sectional view taken along the line I-I illustrated in FIG. 18A, and FIG. 18C is a rear view of the first lateral member.

FIG. 19A is a front view of the second lateral member, and FIG. 19B is a cross-sectional view taken along the line J-J illustrated in FIG. 19A, and FIG. 19C is a rear view of the second lateral member.

FIG. 20A is a front view of a first end cover, and FIG. 20B is a cross-sectional view taken along the line K-K illustrated in FIG. 20A, and FIG. 20C is a rear view of the first end cover.

FIG. 21A is a front view of a second end cover, and FIG. 21B is a cross-sectional view taken along the line L-L illustrated in FIG. 21A, and FIG. 21C is a rear view of the second end cover.

EMBODIMENTS FOR CARRYING OUT THE INVENTION

Figure 1:
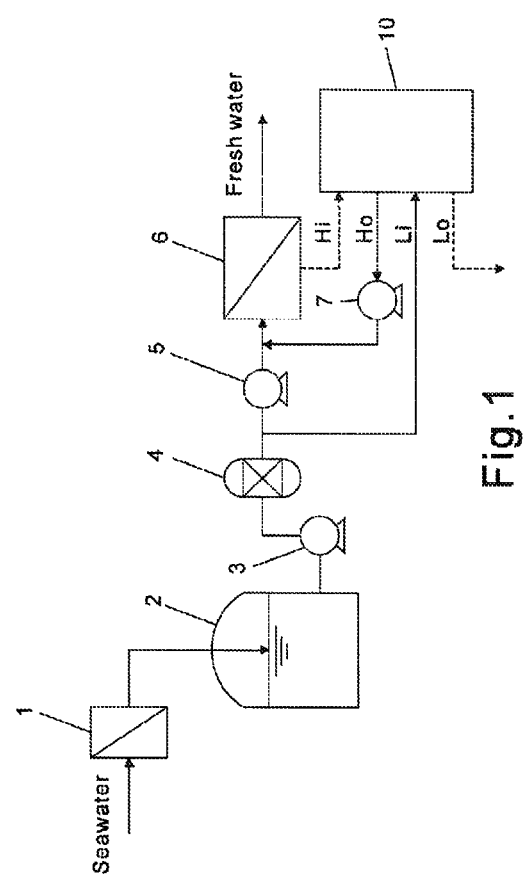
FIG. 1 is a schematic flow diagram of a seawater desalination facility.

Hereinafter, favorable embodiments of a pressure exchange device of the present invention will be described. As is illustrated in FIG. 1, a seawater desalination facility is a facility to desalinate the seawater and includes a pretreatment device 1, a filtration seawater tank 2, a supply pump 3, a safety filter 4, a booster pump 5, a reverse osmosis membrane device 6, and the like.

The seawater from which impurities are removed in the pretreatment device 1 is retained in the filtration seawater tank 2 and supplied to the safety filter 4 by means of the supply pump 3, whereby minute foreign matter contained in the seawater is eliminated, which is aimed at preventing the clogging of the reverse osmosis membrane in the reverse osmosis membrane device 6 arranged at a rear stage. Subsequently, the pressure of the seawater is raised to a predetermined pressure equal to or higher than an osmotic pressure by means of the booster pump 5 and supplied to the reverse osmosis membrane device 6.

The high pressure seawater supplied to the reverse osmosis membrane device 6 is filtered through the reverse osmosis membrane, thereby removing various salts into fresh water. The fresh water obtained in this way is utilized as drinking water, industrial water, and the like.

The reverse osmosis membrane device 6 is a device that pressurizes the seawater on one side of the reverse osmosis membrane and allows the fresh water, from which various salts in the seawater are removed, to percolate on the other side of the reverse osmosis membrane, which is required to raise the pressure of the seawater to a predetermined pressure equal to or higher than the osmotic pressure in order to filter the seawater.

The whole of the seawater supplied to the reverse osmosis membrane device 6 is not desalinated, but, for example, 40 percent of the seawater supplied to the reverse osmosis membrane device 6 is desalinated and taken out, and the remaining 60 percent of the seawater is discharged from the reverse osmosis membrane device 6 without being desalinated. The 60 percent of the concentrated seawater that has not been desalinated retains very high pressure.

Accordingly, the pressure exchange device 10, which raises the pressure of the seawater supplied to the reverse osmosis membrane device 6 by use of the pressure of the high pressure concentrated seawater (hereinafter, referred to as "high pressure concentrated seawater Hi") discharged from the reverse osmosis membrane device 6, is provided in the seawater desalination facility, thereby achieving the improvement of energy efficiency of the entire seawater desalination facility.

For example, the 40 percent of the seawater, out of the seawater supplied from the safety filter 4 to the reverse osmosis membrane device 6, is raised to 6.9 MPa, which is equal to or higher than the osmotic pressure of the reverse osmosis membrane, by means of the high pressure pump 5, and the remaining 60 percent of the seawater (hereinafter, referred to as "low pressure seawater Li") is raised to 6.9 MPa by means of the pressure exchange device 10 and a booster pump 7.

The low pressure seawater Li to be filtered and the high pressure concentrated seawater Hi discharged from the reverse osmosis membrane device 6 are supplied to the pressure exchange device 10, in which pressure is exchanged, and the low pressure seawater Li, which is raised to 6.75 MPa by the high pressure concentrated seawater Hi, is discharged from the pressure exchange device 10 as high pressure seawater Ho.

The high pressure seawater Ho is raised to 6.9 MPa by the booster pump 7 and supplied to the reverse osmosis membrane device 6. It is noted that the high pressure concentrated seawater Hi that has transmitted the pressure to the low pressure seawater Li in the pressure exchange device 10 is discharged from the pressure exchange device 10 as low pressure concentrated seawater Lo.

In the present embodiment described below, the high pressure concentrated seawater Hi and the low pressure concentrated seawater Lo represent the first fluid, and the low pressure seawater Li and the high pressure seawater Ho represent the second fluid. Also, the low pressure seawater Li represents the concentration target fluid.

Hereinafter, the first embodiment of the pressure exchange device will be described. As is illustrated in FIG. 2, the pressure exchange device 10 includes a rotator 40, a first lateral member 20 and a second lateral member 30 that are arranged on bilateral sides of the rotator 40 in such a manner as to sandwich the rotator 40 and rotatably sandwich the rotator 40, and a tubular retentive member 11 arranged in such a manner as to cover the peripheral portion of the rotator 40 between the first lateral member 20 and the second lateral member 30.

Furthermore, a tubular casing 13 is provided that stores the first lateral member 20, the second lateral member 30, and the retentive member 11, and there are included a first end cover 14 that seals one end surface on the first lateral member 20 side and a second end cover 15 that seals the other end surface on the second lateral member 30 side, and the like, with respect to the bilateral end surfaces of the casing 13.

Figure 2:
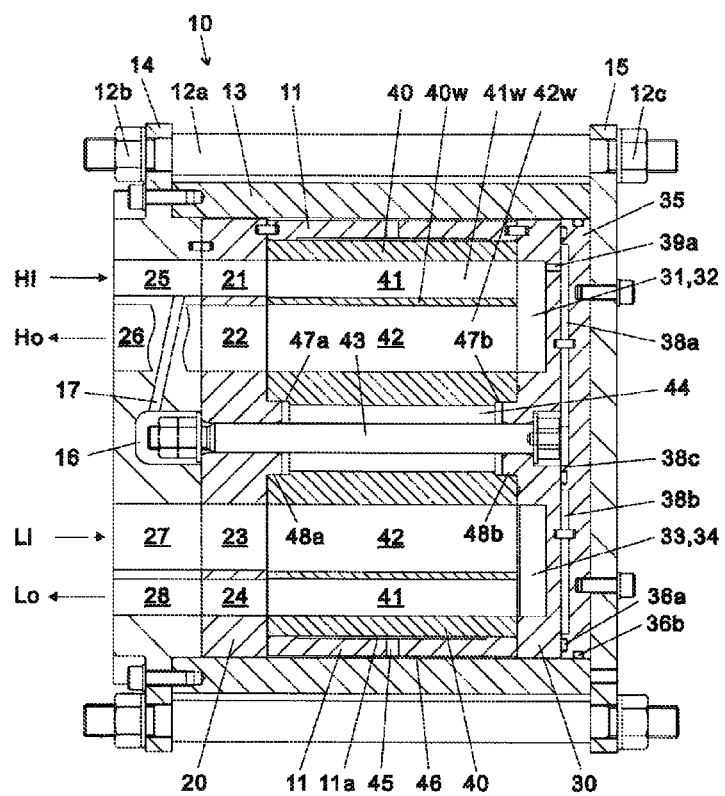
FIG. 2 is a cross-sectional diagram illustrating a first embodiment to describe a pressure exchange device.

As is illustrated in FIG. 2 and FIGS. 3A, B, and C, the rotator 40 is constituted by a cylindrical member wherein a plurality of first flow paths 41 penetrated in the rotation axis direction, through which the first fluid flows in/out from one end side, and a plurality of second flow paths 42 penetrated in the rotation axis direction, through which the second fluid flows in/out from the one end side, are formed in such a manner as to be arranged around the rotation axis.

Specifically, in the rotator 40, 16 sets of first flow paths 41 and second flow paths 42 are arranged in a radial pattern around the rotation axis. Then, the first flow paths 41 and second flow paths 42 are formed in such a manner that each cross-sectional area is approximately equal. Accordingly, this makes it possible to reduce a pressure loss in a case where a fluid flows through the first flow paths 41 and the second flow paths 42 and efficiently transmit the pressure. It is noted that, in the present invention, the cross-sectional areas of the first flow paths 41 and the second flow paths 42 may be set to a slight different value.

A flow path wall 40w formed between the first flow path 41 and the second flow path 42 exists over the entire length of the rotator 40 in the axial direction, so that the stress applied to the partition 41w between the first flow paths 41 and the partition 42w between the second flow paths 42, which are adjacently formed in the circumferential direction of the rotator 40, can be supported with the flow path wall 40w between the first flow path 41 and the second flow path 42.

Figure 4C:
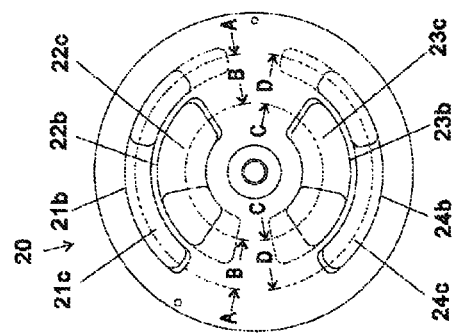
FIG. 4C is a rear view of the first lateral member.
Figure 4B:
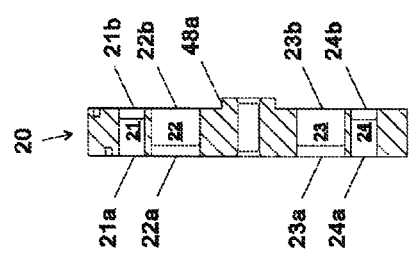
FIG. 4B is a schematic cross-sectional view of the first lateral member.
Figure 4A:
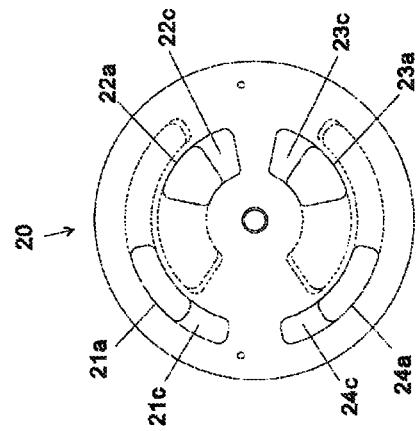
FIG. 4A is a front view of a first lateral member.

As is illustrated in FIG. 2 and FIGS. 4A, B, and C, the first lateral member 20 is constituted by a disk-shaped member in which four flow paths inclusive of the first fluid inflow path 21, the second fluid outflow path 22, the second fluid inflow path 23, and the first fluid outflow path 24 are formed in the thickness direction.

The first fluid inflow path 21 is a flow path that guides the first fluid supplied from the first end cover 14 side to the first flow paths 41. The second fluid inflow path 23 is a flow path that guides the second fluid supplied from the first end cover 14 side to the second flow paths 42.

The second fluid outflow path 22 is a flow path that guides the second fluid, whose pressure has been exchanged for the pressure of the first fluid, from the second flow paths 42 to the first end cover 14 side, and the first fluid outflow path 24 is a flow path that guides the first fluid, whose pressure has been exchanged for the pressure of the second fluid, from the first flow paths 41 to the first end cover 14 side.

As is illustrated in FIG. 2 and FIGS. 5A, B, and C, the second lateral member 30 is a disk-shaped member in which communication sections 31, 32, 33, and 34 that communicate with the first flow paths 41 and the second flow paths 42 and exchange the pressure between the first fluid and second fluid are formed. A pressure exchange unit is constituted by the first flow paths 41, the second flow paths 42, and the communication sections 31, 32, 33, and 34 that communicate therebetween.

Materials, which have corrosion resistance to the seawater and sufficient strength, inclusive of ceramics such as alumina, FRP, or duplex stainless steel, super duplex stainless steel, and the like, can be applied to the first lateral member 20, the second lateral member 30, the rotator 40, and the retentive member 11.

When the duplex stainless steel or the super duplex stainless steel is used, it is preferable that nitriding be applied to the opposite surfaces of the first lateral member 20 and the second lateral member 30 with respect to the rotator 40 and the inner circumferential surface of the retentive member 11, or ceramics such as alumina are metalized and built up by welding, or HIP processing is applied, thereby forming an abrasion-resistant layer that reduces a friction coefficient.

Also, in view of the thermal expansion due to temperature change, it is preferable that the rotator 40 and the retentive member 11 be constituted by selecting the material having the same coefficient of thermal expansion.

Materials that have corrosion resistance to the seawater and the strength of a certain degree, like resin materials, FRP, or metallic materials such as the duplex stainless steel and the super duplex stainless steel, can be applied to the casing 13.

It may be configured such that the corrosion resistance is added by covering the metal tube made of stainless steel having high strength and the like with the resin material or ceramics. Accordingly, this makes it possible to utilize inexpensive materials having poor corrosion resistance, thereby achieving the reduction in costs.

Returning to FIG. 2, an insertion portion 44 is formed and penetrated through the central portion of the rotator 40 along the rotation axis. Bearing portions 47a and 47b that are circumferentially expanded with respect to the central portion are formed on the bilateral end sides of the insertion portion 44. Shaft portions 48a and 48b that are formed in such a manner as to protrude to the bearing portions 47a and 47b are integrally formed with each of the first lateral member 20 and the second lateral member 30.

The shaft portions 48a and 48b of the first lateral member 20 and the second lateral member 30 are inserted into the bearing portions 47a and 47b of the rotator 40, whereby the rotator 40 is rotatably supported.

A support shaft 43 is inserted into the insertion portion 44 in such a manner as to penetrate the shaft portions 48a and 48b, and each end portion of the support shaft 43 is supported with the first lateral member 20 and the second lateral member 30. The support shaft 43 is constituted by a bolt, on the tip of which a screw portion is formed, and the bolt is inserted from the second lateral member 30 side to the first lateral member 20 side, and the screw portion is fastened with a double nut on the first lateral member 20 side.

In the first end cover 14, there are formed a first fluid inflow port 25 communicated with the first fluid inflow path 21, a second fluid outflow port 26 communicated with the second fluid outflow path 22, a second fluid inflow port 27 communicated with the second fluid inflow path 23, and a first fluid outflow port 28 communicated with the first fluid outflow path 24.

Furthermore, the first end cover 14 and the casing 13 are coupled with bolts, and a seal is disposed on a contact surface between the first end cover 14 and the casing 13 in the circumferential direction, thereby preventing the leakage of the fluid to the outside of the casing 13.

The casing 13 is coupled and integrally formed with the first end cover 14 by use of the bolt, so that, when maintenance is performed by pulling out the rotator 40 from the second end cover 15 side, the casing 13 is prevented from coming off with the rotator 40, and maintainability is improved.

The first end cover 14 and the second end cover 15 are fastened by the coupling member 12 constituted by a plurality of bolts 12a on which a screw is formed at the bilateral ends, and nuts 12b and 12c that are spirally engaged with the screws at the bilateral ends.

In the first lateral member 20, there is provided a torque application mechanism that applies torque to the rotator 40 based on the energy of the first fluid that flows into the first flow paths 41 and the energy of the first fluid that flows out from the first flow paths 41, or the energy of the second fluid that flows into the second flow paths 42, and the energy of the second fluid that flows out from the second flow paths 42.

The rotator 40 rotates around the rotation axis by use of the torque applied by the torque application mechanism, whereby the pressures of the high pressure first fluid (high pressure concentrated seawater Hi) that flows from the first fluid inflow path 21 into the first flow paths 41 and the low pressure second fluid (low pressure seawater Li) that flows from the second fluid inflow path 23 into the second flow paths 42 are exchanged via the communication sections 31 and 32 of the second lateral member 30, and the high pressure second fluid (high pressure seawater Ho) flows out from the second fluid outflow path 22.

Similarly, the rotator 40 rotates around the rotation axis by use of the torque applied by the torque application mechanism, whereby the pressures of the high pressure first fluid (high pressure concentrated seawater Hi) that flows from the first fluid inflow path 21 into the first flow paths 41 and the low pressure second fluid (low pressure seawater Li) that flows from the second fluid inflow path 23 into the second flow paths 42 are exchanged via the communication sections 33 and 34 of the second lateral member 30, and the low pressure first fluid (low pressure concentrated seawater Lo) flows out from the first fluid outflow path 24.

That is, the rotator 40 rotates in a space that is partitioned by the first lateral member 20, the second lateral member 30, and the retentive member 11, so that the pressure exchange processing is successively performed wherein the second fluid, whose pressure is transmitted from the first fluid that flows from the first fluid inflow path 21 into the first flow paths 41, flows out from the second flow paths 42 into the second fluid outflow path 22, and the first fluid, whose pressure is transmitted from the second fluid that flows from the second fluid inflow path 23 into the second flow paths 42, flows out from the first flow paths 41 into the first fluid outflow path 24.

A gap in which each fluid enters is formed between the rotator 40 and the first lateral member 20, and the second lateral member 30.

The rotator 40 is pressed toward the second lateral member 30 by the first fluid or the second fluid that enters the gap between the rotator 40 and the first lateral member 20. The rotator 40 is pressed toward the first lateral member 20 by the first fluid or the second fluid that enters the gap between the rotator 40 and the second lateral member 30. A pressing force applied to the first lateral member 20 and the second lateral member 30 is received by the first end cover 14 and the second end cover 15.

As a result, the rotator 40 is pressed with an approximately equivalent force on the bilateral sides along the axial direction, so that pressure balance is maintained without leaning to one side of any of the first lateral member 20 and the second lateral member 30. Moreover, the fluid that enters each gap functions as lubricant, so that the rotator 40 is prevented from sliding with the first lateral member 20 or the second lateral member 30, which allows the rotator 40 to stably, smoothly rotate.

Furthermore, a gap between the rotator 40 and the retentive member 11 is formed, and the fluid that enters the gap functions as lubricant, so that the rotator 40 can be prevented from sliding on the inner circumferential surface of the retentive member 11 and stably, smoothly be rotated.

Specifically, the inner diameter of the retentive member 11 is set slightly larger than the external diameter of the rotator 40, and the length of the retentive member 11 is set slightly longer than the length of the rotation axis direction of the rotator 40. Also, a plurality of third communication paths 45 are formed and penetrated through the circumferential surface of the retentive member 11 at a position symmetrical to the circumferential direction.

The fluid, which enters the gap between the outer circumferential surface of the rotator 40 and the inner circumferential surface of the retentive member 11 via the gap between the rotator 40 and the first lateral member 20, and the second lateral member 30, enters an outer circumferential enclosed space 46 between the outer circumferential surface of the retentive member 11 and the inner circumferential surface of the casing 13 via a circumferentially expanded area 11a and the third communication paths 45.

The pressure of the fluid that is guided to the outer circumferential enclosed space 46 is approximately equal to the pressure of the fluid that is applied to the gap between the rotator 40 and the inner circumferential surface of the retentive member 11, pressing forces applied to the bilateral surfaces of the inner circumferential surface and the outer circumferential surface of the retentive member 11 are balanced. With this constitution adopted, the retentive member 11 is prevented from being warped in the radial direction, which makes it possible to reduce the thickness of the retentive member 11.

That is, the abrasion between the rotator 40 and the first lateral member 20, and the second lateral member 30, and the retentive member 11 can be reduced, and durability can be improved without the use of expensive abrasion resistance materials.

With this constitution, even when it is configured to form a large diameter of the rotator 40 and expand the cross-sectional areas of the first flow path 41 and the second flow path 42 in order to increase the treatment flow rate of the pressure exchange device 10, the energy required for the torque application mechanism to rotationally drive the rotator 40 is suppressed low.

It is noted that, when each gap is too narrow, a great sliding resistance occurs, which leads to an increase of necessary energy for rotation, and when each gap is too large, the leakage of the fluid increases, which reduces the efficiency of the pressure exchange. Preferably, each gap is set to about 1 to 100 μm. Each gap is set based on the difference of the lengths in the axial direction of the rotator 40 and retentive member 11, and it is preferable that the rotator 40 and retentive member 11 be formed of the same material in such a manner as not to change the gap even when expansion occurs due to the heat generation attributed to the sliding.

In the pressure exchange device 10, there is provided a press mechanism that presses at least one of any of the first lateral member 20 and the second lateral member 30 and adjusts the gap between the first lateral member 20 and the second lateral member 30, whereby the gap is configured to be desirably adjustable.

Specifically, the coupling member 12 that couples the first end cover 14 with the second end cover 15 functions as the press mechanism, and the interval between the first end cover 14 and the second end cover 15 is adjusted by regulating the clamping force of the nuts 12b and 12c. Accordingly, the first lateral member 20 and the second lateral member 30 are pressed with the first end cover 14 and the second end cover 15, whereby the gap between the rotator 40 and the first lateral member 20, and the second lateral member 30 is regulated.

Also, the support shaft 43 that is supported by the first lateral member 20 and the second lateral member 30 functions as the press mechanism, and the gap between the rotator 40 and the first lateral member 20, and the second lateral member 30 is regulated by regulating the clamping force of the double nuts.

The gap in the peripheral edge area between the rotator 40 and the first lateral member 20, and the second lateral member 30 is mainly regulated by the coupling member 12, and the gap in the central portion between the rotator 40 and the first lateral member 20, and the second lateral member 30 is mainly regulated by the support shaft 43.

Even when the end surface between the first lateral member 20 or the second lateral member 30 and the rotator 40 is worn, which causes the expansion of the gap, and even when the leak of the fluid leads to the reduction of the efficiency of pressure exchange, the gap between the first lateral member 20 or the second lateral member 30 and the rotator 40 can be regulated by the press mechanism, whereby the exchange frequency attributed to the abrasion of main components such as the rotator 40 can be reduced.

Furthermore, a first enclosed space 16 that is partitioned with the first lateral member 20 and the first end cover 14 is formed, and a first communication path 17 is formed in the first end cover 14 in such a manner as to guide at least the first fluid or the second fluid to the first enclosed space 16.

Specifically, a recessed portion is formed in the central portion of the first end cover 14, and the first enclosed space 16 is partitioned with the recessed portion and the first lateral member 20. The first enclosed space 16 serves as a storage space for the double nuts that clamp the support shaft 43.

In the first end cover 14, a first communication port 25 to guide the first fluid or the second fluid to the first enclosed space 16 is formed. In the present embodiment, one end of the first communication path 17 is configured to be opened to the first fluid inflow path 21, and the first fluid (high pressure concentrated seawater Hi) flows into the first enclosed space 16 via the first communication path 17.

The pressure is applied to the first lateral member 20 in the external direction separating from the rotator 40, by means of the first fluid or the second fluid that enters the gap between the rotator 40 and the first lateral member 20. In particular, the pressure of the fluid that flows into the insertion portion 44 is applied to the central area of the first lateral member 20 facing the first enclosed space 16.

However, the first fluid or the second fluid is guided from the first communication path 17 formed in the first end cover 14 to the first enclosed space 16, so that the pressure balance is maintained on the bilateral surfaces of the first lateral member 20 facing the first enclosed space 16.

Second enclosed spaces 38a and 38b that are partitioned with the second lateral member 30 and the second end cover 15 are formed, and second communication paths 39a and 39b are formed in the second lateral member 30 in such a manner as to guide at least the first fluid or the second fluid to the second enclosed spaces 38a and 38b.

Specifically, as is illustrated in FIG. 2, FIGS. 5A, B, and C, and FIGS. 8A, B, and C, a sealing plate 35 is arranged between the second lateral member 30 and the second end cover 15. The second enclosed spaces 38a and 38b are partitioned with a partition 38c formed on one end surface of the sealing plate 35 and the second lateral member 30.

A seal 36a is provided on one end surface of the sealing plate 35, which contacts the second lateral member 30, and a seal 36b is provided on the outer circumferential surface of the sealing plate 35. The sealing plate 35 is fixed on the second end cover 15 with bolts. Accordingly, the nuts 12b and 12c of the coupling member 12 are tightened, whereby the sealing plate 35 is pressed against the second lateral member 30.

The second communication path 39a that guides the high pressure fluid to the second enclosed space 38a is formed and penetrated in the thickness direction through the communication sections 31 and 32 formed in the second lateral member 30. The second communication path 39b that guides a low pressure fluid to the second enclosed space 38b is formed and penetrated in the thickness direction through the communication sections 33 and 34 formed in the second lateral member 30.

The fluid of the communication sections 31 and 32 flows into the second enclosed space 38a via the second communication path 39a, and the fluid of the communication sections 33 and 34 flows into the second enclosed space 38b via the second communication path 39b. The pressure of the fluids flown into the second enclosed spaces 38a and 38b is applied in such a manner as to press the second lateral member 30 toward the rotator 40.

A pressing force, with which the high pressure concentrated seawater Hi and the high pressure seawater Ho that flow though the first flow paths 41 and the second flow paths 42 of the rotator 40 are applied to the second lateral member 30, is equilibrated with a pressing force that is applied from the second enclosed spaces 38a to the second lateral member 30.

Also, a pressing force, with which the low pressure concentrated seawater Lo and the low pressure seawater Li that flow though the first flow paths 41 and the second flow paths 42 of the rotator 40 are applied to the second lateral member 30, is equilibrated with a pressing force that is applied from the second enclosed spaces 38b to the second lateral member 30.

In the above-described example, the sealing plate 35 and the second end cover 15 may integrally be formed. In this case, the second enclosed space 38 is partitioned with the second lateral member 30 and the second end cover. Also, the example in which the second enclosed spaces 38a and 38b are divided by the partition 38c has been described, but as long as the pressure balance is maintained, the number of partitions of the second enclosed space may be increased, for example, divided into four.

As is described above, the first lateral member 20 and the second lateral member 30 can secure the balance of the pressure applied to the bilateral surfaces thereof, which prevents the occurrence of a warp in the rotation axis direction, so that the thickness of the first lateral member 20 and the second lateral member 30 can be reduced. Moreover, the first lateral member 20 and the second lateral member 30 both can secure the balance of the pressure applied to the bilateral surfaces thereof, so that the gap between the rotator 40 and the first lateral member 20, and the second lateral member 30 can be kept constant on the entire surface, which allows the rotator 40 to smoothly rotate.

It is noted that the occurrence of a sag leads to an increase or a decrease in the width of the gap between the rotator 40 and the first lateral member 20, and the second lateral member 30. When the gap is narrowed, the rotation resistance is increased, and the necessary energy for the rotator 40 is augmented, and when the gap is widen, the leak of the fluid is augmented, and the efficiency is reduced in both cases.

It is preferable that, in consideration of the balance of the pressure applied to the rotator, the first and second lateral members, and the first and second end covers, and the flow of the fluids, each be fixed with pins, bolts, and the like in such a manner that the positional relations of the circumferential direction of the first and second lateral members, the first and second end covers, and the sealing plate are not changed in the circumferential direction.

Next, the torque application mechanism will be described in detail based on FIG. 2, FIGS. 4A, B, and C, and FIGS. 6A, B, C, and D. As is illustrated in FIGS. 4A, B, and C, the first fluid inflow path 21 is configured to include a flow path wall 21c as a first inclined portion that is circumferentially expanded and formed in the circumferential direction, from an entry side opening portion 21a to an exit side opening portion 21b of the first lateral member 20. Also, the first fluid inflow path 21 is configured to simultaneously communicate with the plurality of first flow paths 41 arranged in the circumferential direction of the rotator 40 at the exit side opening portion 21b.

The second fluid outflow path 22 is configured to include a flow path wall 22c as a second inclined portion that is circumferentially expanded and formed in the circumferential direction, from an exit side opening portion 22a to an entry side opening portion 22b of the first lateral member 20. Also, the second fluid outflow path 22 is configured to simultaneously communicate with the plurality of second flow paths 42 along with the circumferential direction of the rotator 40 with regards to the entry side opening portion 22b.

The second fluid inflow path 23 is configured to include a flow path wall 23c as a second inclined portion that is circumferentially expanded and formed in the circumferential direction, from an entry side opening portion 23a to an exit side opening portion 23b of the first lateral member 20. Also, the second fluid inflow path 23 is configured to simultaneously communicate with the plurality of second flow paths 42 along with the circumferential direction of the rotator 40 with regards to the exit side opening portion 23b.

The first fluid outflow path 24 is configured to include a flow path wall 24c as a first inclined portion that is circumferentially expanded and formed in the circumferential direction, from an exit side opening portion 24a to an entry side opening portion 24b of the first lateral member 20. Also, the first fluid outflow path 24 is configured to simultaneously communicate with the plurality of first flow paths 41 along with the circumferential direction of the rotator 40 with regards to the entry side opening portion 24b.

The torque application mechanism for the rotator 40 is constituted by the fluid inflow paths 21 and 23 and the fluid outflow paths 22 and 24 having a shape described above.

Figure 6A:
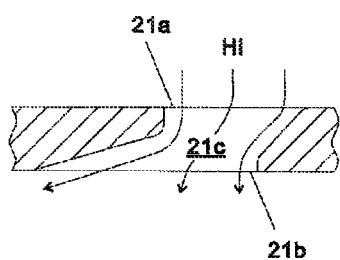
FIG. 6A is a cross-sectional view taken along the line A-A of a first fluid inflow path illustrated in FIG. 4C.
Figure 6B:
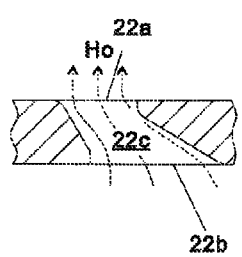
FIG. 6B is a cross-sectional view taken along the line B-B of a second fluid outflow path illustrated in FIG. 4C.

As is illustrated in FIGS. 6A and C, the inclination direction of the flow path wall 21c and the inclination direction of the flow path wall 23c are set to the same direction with respect to the circumferential direction.

As is illustrated in FIGS. 6A and B, the inclination direction of the flow path wall 21c and the inclination direction of the flow path wall 22c are inversely set with respect to the circumferential direction.

Figure 6C:
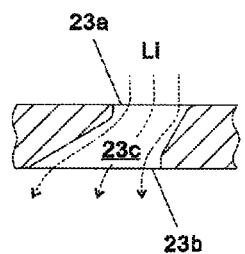
FIG. 6C is a cross-sectional view taken along the line C-C of a second fluid inflow path illustrated in FIG. 4C.
Figure 6D:
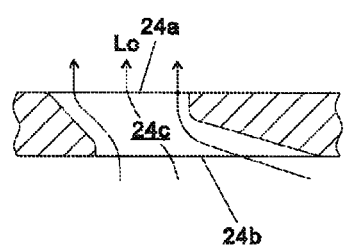
FIG. 6D is a cross-sectional view taken along the line D-D of a first fluid outflow path illustrated in FIG. 4C.

As is illustrated in FIGS. 6C and D, the inclination direction of the flow path wall 23c and the inclination direction of the flow path wall 24c are inversely set with respect to the circumferential direction.

The high pressure concentrated seawater Hi, which flows from the entry side opening portion 20a of the first lateral member 20 into the first fluid inflow path 21, flows along the flow path wall 21c as the first inclined portion and dispersedly flows from the exit side opening portion 20b into the plurality of first flow paths 41.

In this time, the high pressure concentrated seawater Hi, which flows through the first fluid inflow path 21 along with the circumferential direction of the rotator 40, applies the pressure to a wall surface (partition 41w) formed between the first flow paths 41, and this pressure serves as the torque that allows the rotator 40 to rotate.

Also, the high pressure seawater Ho flowing through the plurality of second flow paths 42 converges, and the high pressure seawater Ho flows from the entry side opening portion 22b of the first lateral member 20 to the second fluid outflow paths 22 and flows along the flow path wall 22c as the second inclined portion and flows out from the exit side opening portion 22a.

In this case, the high pressure seawater Ho that flows from the second flow paths 42 into the second fluid outflow paths 22 flows in the direction that the flow passage cross-sectional area is expanded, so that the high pressure seawater Ho applies the pressure to a wall surface (partition 42w) formed between the second flow paths 42, and this pressure serves as the torque that allows the rotator 40 to rotate.

The inclination direction of the flow path wall 21c and the inclination direction of the flow path wall 22c are inversely set, so that the torque, which is generated in a case where the high pressure concentrated seawater Hi flows from the first fluid inflow path 21 into the first flow paths 41, and the torque, which is generated in a case where the high pressure seawater Ho flows from the second flow paths 42 into the second fluid outflow path 22, are directed in the same direction.

That is, the torque application mechanism generates the torque that allows the rotator 40 to rotate, based on energy of the high pressure concentrated seawater Hi that flows into the rotator 40 and the high pressure seawater Ho that flows out from the rotator 40. In this time, large torque can be generated, compared with a case where the rotator 40 is rotated based on only any one of the above-described energies.

Similarly, the torque that allows the rotator 40 to rotate is generated based on the energy in a case where the low pressure seawater Li flows in the second flow paths 42 along with the flow path wall 23c of the second fluid inflow path 23, and the torque that allows the rotator 40 to rotate is generated based on the energy in a case where the low pressure concentrated seawater Lo flows out from the first flow paths 41 into the flow path wall 24c of the first fluid outflow path 24. Then, both the torque are directed in the same direction.

Accordingly, the rotator 40 can be rotated based on the energy of the fluid which is targeted for pressure conversion, without the addition of external motive power. Then, the inflow and outflow of the first fluid and the inflow and outflow of the second fluid into the pressure transmission unit can be switched with the rotation of the rotator 40, so that a separate switching mechanism for flow paths is eliminated.

It is noted that, when the energy of the fluid that flows into the flow path isolated substantially away from the rotation axis in the radial direction or the energy of the fluid that flows out from the flow path isolated substantially away from the rotation axis in the radial direction is utilized, the large torque can be generated with the same amount of energy, which is efficient in energy.

The communication sections 31, 32, 33, and 34 formed in the second lateral member 30 will be described in detail based on FIG. 2 and FIGS. 5A and B. At the time of pressure exchange, the plurality of first flow paths 41 adjacent in the circumferential direction that the high pressure concentrated seawater Hi flows from the first fluid inflow path 21 simultaneously communicate with the plurality of second flow paths 42 similarly adjacent in the circumferential direction via the communication sections 31 and 32, and the high pressure seawater Li after the pressure exchange flows out via the second fluid outflow path 22.

At this time, pressure losses that are generated in the plurality of first flow paths 41 and the plurality of second flow paths 42 are respectively different in the circumferential direction, which is attributed to the operation of the torque application mechanism. Accordingly, there is an apprehension that, when the fluid that flows from the first flow paths 41 to the communication section 31 flows through the second flow paths 42 having a low pressure loss via the communication section 32, the torque application mechanism does not appropriately function, which leads to the reduction of rotatory power. There is an apprehension that the similar phenomenon occurs in the communication sections 33 and 34.

Figure 7:
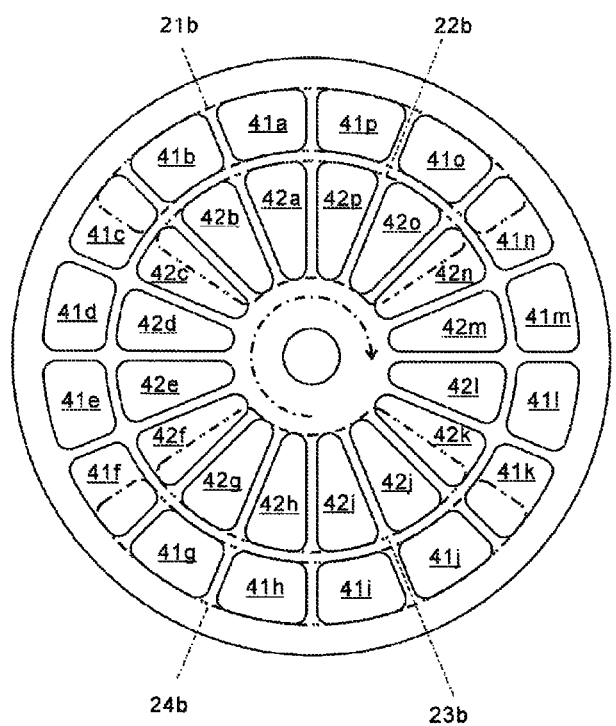
FIG. 7 is an explanatory diagram illustrating positions of each flow path formed in the rotator and each inflow path and each outflow path formed in the first lateral member.

The flow path having a low pressure loss represents a flow path that linearly communicates from the inflow path to the outflow path, and for example represents first flow paths 41b and 41j and second flow paths 42o and 42g in FIG. 7.

Accordingly, partitions w whose height is slightly lower than the height of the surface of the second lateral member 30 are respectively formed at the central portions of the communication sections 31 and 32 and the communication sections 33 and 34, in order to maintain the appropriate torque by means of the torque application mechanism.

The flow in the circumferential direction, that is, the flow into the flow path having a low pressure loss (for example, the flow from the first flow path 41b to the second flow path 42o, or the flow from the second flow path 42g to the first flow path 41j in FIG. 7) is impeded by the partitions w.

As a result, the flow from the first flow paths 41 adjacent in the radial direction to the second flow paths 42, or the flow from the second flow paths 42 to the first flow paths 41 (for example, the flow from the first flow path 41b to the second flow path 42b, or the flow from the second flow path 42j to the first flow path 41j) is secured, whereby the torque application mechanism appropriately functions.

Furthermore, on the surface where the communication sections 31, 32, 33, and 34 of the second lateral member 30 are formed, two sets of communication grooves 37a and 37b are formed. The communication grooves 37a and 37b, for example, are formed of a groove of about several millimeters, and disposed between the communication section 31 and the communication section 34 and between the communication section 32 and the communication section 33.

When the high pressure fluid in the first flow paths 41 or the second flow paths 42 of the rotator 40 enters the communication path of the low pressure fluid, the pressure is reduced stepwise via the communication grooves 37a and 37b, which alleviates a large pressure fluctuation, and when the low pressure fluid enters the communication path of the high pressure fluid, the pressure is raised stepwise via the communication grooves 37a and 37b, which alleviates the large pressure fluctuation.

This constitution prevents the occurrence of unfavorable situations such as cavitation due to the exponential change of the pressure of a case where the high pressure fluid enters the communication path of the low pressure fluid. Also, the difference of the water pressure applied to the partitions 41w and 42w of the rotator 40 is reduced, and the apprehension of the damage of the rotator 40 is allayed, and the thickness of the partitions 41w and 42w can be reduced, and the reduction in weight and the enhancement of capacity can be achieved.

Concrete pressure exchange processing of the pressure exchange device 10 having the above-described constitution will be described. As is illustrated in FIG. 7, in the rotator 40, 16 sets of pressure transmission units constituted by the first flow paths 41a to 41p and the second flow paths 42a to 42p are radially arranged around the rotation axis.

In FIG. 7, an area illustrated by a chain double-dashed line represents an area corresponding to the exit side opening portion 21b of the first fluid inflow path 21, the entry side opening portion 22b of the second fluid outflow path 22, the exit side opening portion 23b of the second fluid inflow path 23, and the entry side opening portion 24b of the first fluid outflow path 24, which are formed in the first lateral member 20.

Six sets of first flow paths 41c, 41b, 41a, 41p, 41o, and 41n adjacent in the circumferential direction of the rotator 40 simultaneously communicate with the first fluid inflow path 21, and six sets of second flow paths 42c, 42b, 42a, 42p, 42o, and 42n similarly adjacent in the circumferential direction of the rotator 40 simultaneously communicate with the second fluid outflow path 22.

The first flow paths 41c, 41b, 41a, 41p, 41o, and 41n and the second flow paths 42c, 42b, 42a, 42p, 42o, and 42n communicate with each other through the communication sections 31 and 32 formed in the second lateral member 30.

Six sets of second flow paths 42f, 42g, 42h, 42i, 42j, and 42k adjacent in the circumferential direction of the rotator 40 simultaneously communicate with the second fluid inflow path 23, and six sets of first flow paths 41f, 41g, 41h, 41i, 41j, and 41k similarly adjacent in the circumferential direction of the rotator 40 simultaneously communicate with the first fluid outflow path 24.

The second flow paths 42f, 42g, 42h, 42i, 42j, and 42k and the first flow paths 41f, 41g, 41h, 41i, 41j, and 41k communicate with each other through the communication sections 33 and 34 formed in the second lateral member 30.

When the high pressure concentrated seawater Hi flowing through the first fluid inflow path 21 diverges and flows into the first flow paths 41c, 41b, 41a, 41p, 41o, and 41n respectively, the high pressure concentrated seawater Hi flows along the flow path wall 21c, and clockwise torque is applied to the rotator 40 as illustrated with an arrow of a dashed line in FIG. 7.

The pressure of the high pressure concentrated seawater Hi flowing through the first flow paths 41c, 41b, 41a, 41p, 41o, and 41n is transmitted to the seawater in the second flow paths 42c, 42b, 42a, 42p, 42o, and 42n that are respectively communicated in the second lateral member 30, and the high pressure seawater Ho flows out from the second flow paths 42c, 42b, 42a, 42p, 42o, and 42n to the second fluid outflow path 22.

When the high pressure seawater Ho flows out from the second flow paths 42c, 42b, 42a, 42p, 42o, and 42n to the second fluid outflow path 22, the high pressure seawater Ho flows along with the flow path wall 22c in such a manner as to spread the flow of the high pressure seawater Ho, and the clockwise torque is applied to the rotator 40 as illustrated with the arrow of the dashed line in FIG. 7.

When the low pressure seawater Li flowing through the second fluid inflow path 23 diverges and flows into the second flow paths 42f, 42g, 42h, 42i, 42j, and 42k respectively, the low pressure seawater Li flows along with the flow path wall 23c, and the clockwise torque is applied to the rotator 40 as illustrated with the arrow of the dashed line in FIG. 7.

The pressure of the low pressure seawater Li flowing through the second flow paths 42f, 42g, 42h, 42i, 42j, and 42k is transmitted to the concentrated seawater of the first flow paths 41f, 41g, 41h, 41i, 41j, and 41k that are respectively communicated in the second lateral member 30, and the low pressure concentrated seawater Lo flows out from the first flow paths 41f, 41g, 41h, 41i, 41j, and 41k into the first fluid outflow path 24.

When the low pressure concentrated seawater Lo flows out from the first flow paths 41f, 41g, 41h, 41i, 41j, and 41k into the first fluid outflow path 24, the low pressure concentrated seawater Lo flows along with the flow path wall 24c in such a manner as to spread the flow thereof, and the clockwise torque is applied to the rotator 40 as illustrated with the arrow of the dashed line in FIG. 7.

As is described above, the torque that the high pressure concentrated seawater Hi provides with the rotator 40, the torque that the high pressure seawater Ho provides with the rotator 40, the torque that the low pressure seawater Li provides with the rotator 40, and the torque that the low pressure concentrated seawater Lo provides with the rotator 40 are all directed in the same direction, whereby the rotator 40 rotates clockwise.

The pairs of the first flow paths 41 and the second flow paths 42, which respectively communicate with the first fluid inflow path 21 and the second fluid outflow path 22, and the second fluid inflow path 23 and the first fluid outflow path 24, are switched with the rotation of the rotator 40.

Then, the transmission of the pressure from the high pressure concentrated seawater Hi to the high pressure seawater Ho and the transmission of the pressure from the low pressure seawater Li to the low pressure concentrated seawater Lo, that is, the pressure exchange processing between the first fluid and the second fluid is successively carried out.

Although the concentrated seawater and the seawater coexist in the first flow paths 41 and the second flow paths 42, there is a difference in salinity concentration for respective fluids, so that a dilution zone is formed by diffusion only in the boundary part, and the entire seawater is not mixed. The dilution zone serves as a piston and reciprocates in a constant range in the inside of the flow path formed by the first flow paths 41, the communication sections 31, 32, 33, and 34, and the second flow paths 42.

When the rotator 40 rotates, the pressure exchange is not performed in the first flow paths 41d, 41e, 41l, and 41m and the second flow paths 42d, 42e, 42l, and 42m, which do not communicate with any of the first fluid inflow path 21, the second fluid outflow path 22, the second fluid inflow path 23, and the first fluid outflow path 24.

In the present embodiment, the example has been described where five sets or six sets of first flow paths and second flow paths simultaneously communicate with the first fluid inflow path 21, the second fluid outflow path 22, the second fluid inflow path 23, and the first fluid outflow path 24 with the rotation of the rotator, but the number of flow paths that are simultaneously communicated is not limited to these values, but can appropriately be set.

When the number of first flow paths and second flow paths that are simultaneously communicated is small, and the number of first flow paths and second flow paths that do not communicate with any path is large, the pulsation of water discharged from the device is increased. Also, when the number of flow paths that do not communicate with any of the first fluid inflow path and the fluid outflow path is small, the leakage from the high pressure fluid to the low pressure fluid is increased.

The rotator 40 is configured to rotate based on energy of the high pressure concentrated seawater Hi and the low pressure seawater Li that flow into the rotator 40 and the high pressure seawater Ho and the low pressure concentrated seawater Lo that flow out from the rotator 40, so that large torque can be provided, compared with a case where the rotator 40 rotates only based on the energy of each fluid that flows thereinto.

When the shapes of the flow path walls 21c, 22c, 23c, and 24c are changed, the flow of the fluid that flows from the inflow path into each flow path and the flow of the fluid that flows out from the each flow path to the outflow path are changed, and the torque applied to the rotator is changed, and the number of rotations of the rotator is changed.

That is, the number of rotations of the rotator 40 depends on the shapes of the flow path walls 21c, 22c, 23c, and 24c. The treatment flow rate of the pressure exchange device 10 depends on the number of rotations of the rotator 40, so that the number of rotations of the rotator 40 is adjusted by changing the shapes of the flow path walls 21c, 22c, 23c, and 24c, whereby the treatment flow rate of the pressure exchange device 10 can be adjusted. For example, a plurality of first lateral members having the different shapes are prepared, and the treatment flow rate can easily be adjusted by selecting any of the first lateral members.

Next, the second embodiment of the pressure exchange device will be described. In the description below, constitution that is different from that of the first embodiment will be mainly described in detail, and the same constitution as that of the first embodiment is simplified. It is noted that the same members in FIG. 9 to FIGS. 16A and B, which illustrate the second embodiment, are designated as the same reference numbers of the first embodiment.

Figure 9:
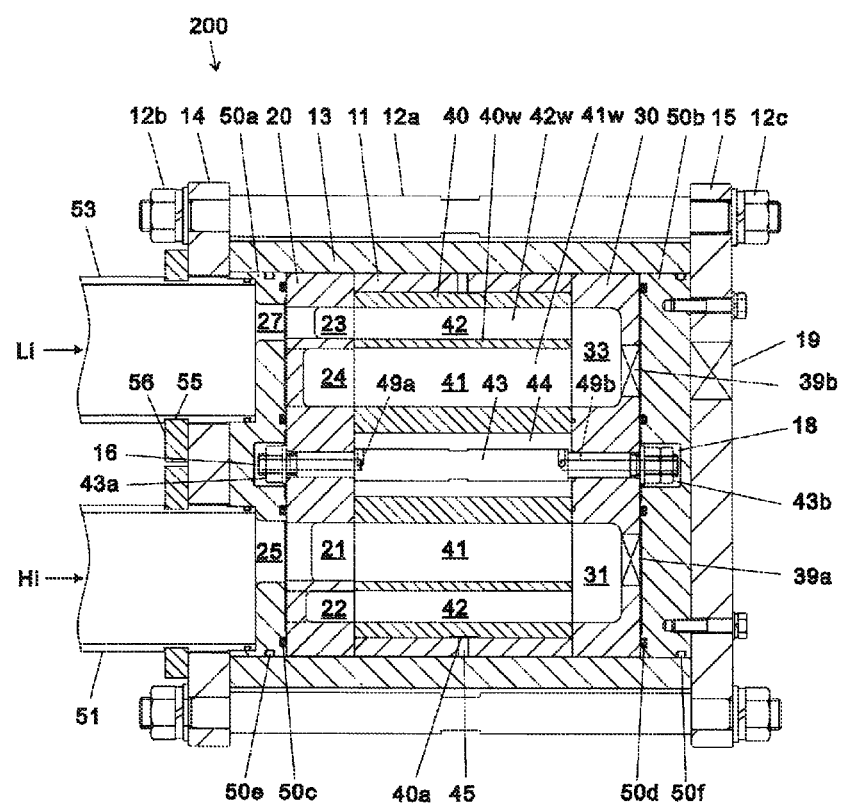
FIG. 9 is a cross-sectional view illustrating a second embodiment to describe the pressure exchange device.

As is illustrated in FIG. 9, a pressure exchange device 200 of the second embodiment, which is similar to the first embodiment, includes the rotator 40, and the first lateral member 20 and the second lateral member 30 that are arranged on the bilateral sides of the rotator 40 in such a manner as to sandwich the rotator 40 and rotatably sandwich the rotator 40, and the tubular retentive member 11 arranged in such a manner as to cover the peripheral portion of the rotator 40 between the first lateral member 20 and the second lateral member 30.

Furthermore, the tubular casing 13 is provided that stores the first lateral member 20, the second lateral member 30, and the retentive member 11, and in the casing 13, there are included the first end cover 14 that seals one end surface on the first lateral member 20 side and the second end cover 15 that seals the other end surface on the second lateral member 30 side, and the like.

Figure 10B:
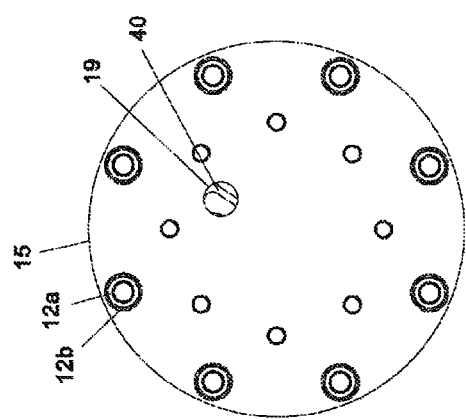
FIG. 10B is a rear view of the pressure exchange device.
Figure 10A:
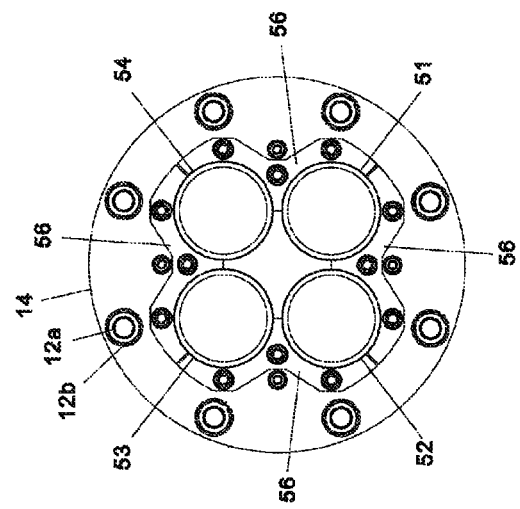
FIG. 10A is a front view of the pressure exchange device.

As is illustrated in FIG. 9 and FIGS. 10A and B, an inflow pipe 51 of the high pressure concentrated seawater Hi, an outflow pipe 52 of the high pressure seawater Ho, an inflow pipe 53 of the low pressure seawater Li, and an outflow pipe 54 of the low pressure concentrated seawater Lo are connected to the first end cover 14.

The high pressure concentrated seawater Hi, which flows from the inflow pipe 51 into the first flow paths 41 of the rotator 40 via the first fluid inflow path 21, and the low pressure seawater Li, which flows from the inflow pipe 53 into the second flow paths 42 of the rotator 40 via the second fluid inflow path 23 and has completed the pressure exchange for the low pressure concentrated seawater Lo in the first flow paths 41, are communicated through the communication sections 31 and 32 (see FIG. 15A), whereby the pressure exchange is performed. As a result, the high pressure seawater Ho flows out from the outflow pipe 52 via the second fluid outflow path 22.

Similarly, the low pressure seawater Li, which flows from the inflow pipe 53 into the second flow paths 42 of the rotator 40 via the second fluid inflow path 23, and the low pressure concentrated seawater Lo, which flows from the inflow pipe 51 into the first flow paths 41 of the rotator 40 via the first fluid inflow path 21 and has completed the pressure exchange for the low pressure seawater Li in the second flow paths 42, are communicated through the communication sections 33 and 34 (see FIG. 15A), whereby the pressure exchange is performed. As a result, the low pressure concentrated seawater Lo flows out from the outflow pipe 54 via the first fluid outflow path 24.

Figure 12C:
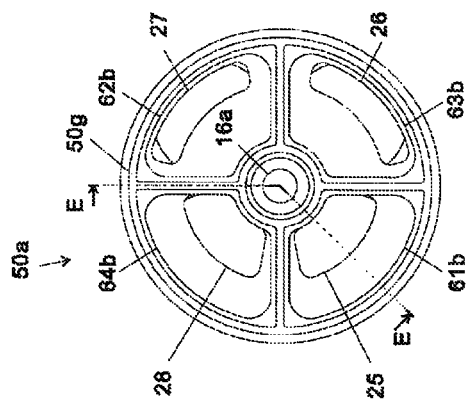
FIG. 12C is a rear view of the first sealing plate.
Figure 12B:
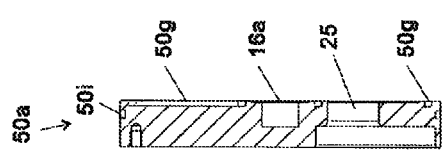
FIG. 12B is a cross-sectional view taken along the line E-E illustrated in FIG. 12C.
Figure 12A:
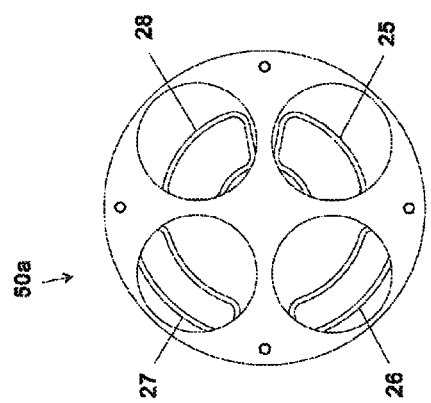
FIG. 12A is a front view of a first sealing plate.

As is illustrated in FIG. 9 and FIGS. 12A, B, and C, a disk-shaped first sealing plate 50a to seal the end portion of the casing 13 is fixed to the first end cover 14 with bolts. The diameter of the first sealing plate 50a is set slightly smaller than the inner circumference of the casing 13, and a groove 50i to fit a seal 50e (see FIG. 9) into a gap between the inner circumference of the casing 13 and the first sealing plate 50a is formed on the outer circumference thereof. It is noted that the first sealing plate 50a constituting part of the first end cover 14 may integrally be formed with the first end cover 14.

The first fluid inflow port 25, the second fluid outflow port 26, the second fluid inflow port 27, and the first fluid outflow port 28 are formed and penetrated through the first sealing plate 50a in the thickness direction of the first sealing plate 50a. The opening portion of the end surface opposite to the first end cover 14 is formed in a circular shape in such a manner as to be capable of inserting the end portions of the above-described pipes 51, 52, 53, and 54. The opening portion of the end surface opposite to the first lateral member 20 is formed in shapes corresponding to the first fluid inflow path 21, the second fluid outflow path 22, the second fluid inflow path 23, and the first fluid outflow path 24.

When the first sealing plate 50a is arranged opposite to the first lateral member 20, the first fluid inflow port 25 and the first fluid inflow path 21 are communicated. Similarly, the second fluid outflow port 26 and the second fluid outflow path 22 are communicated, and the second fluid inflow port 27 and the second fluid inflow path 23 are communicated, and the first fluid outflow port 28 and the first fluid outflow path 24 are communicated.

As is illustrated in FIG. 9 and FIGS. 10A and B, a notch portion 55 is formed along with the circumferential direction at a predetermined position in the vicinity of the end portion of respective pipes 51, 52, 53, and 54. The end portions of the pipes 51, 52, 53, and 54 are respectively inserted into each opening portion formed in the first end cover 14 and further inserted into the opening portion (see FIG. 12A) of the first fluid inflow port 25, the second fluid outflow port 26, the second fluid inflow port 27, and the first fluid outflow port 28, which are formed in the first sealing plate 50a constituting part of the first end cover 14. Furthermore, subsequently, a port cap 56 in a state of being fitted into each notch portion 55 is fixed to the first end cover 14 with bolts.

Thus, each of pipes 51, 52, 53, and 54 is connected to the pressure exchange device 200. In the present embodiment, there are provided four port caps 56 in the aggregate, each of which is provided between the adjacent two pipes and fitted into each notch portion 55 of the adjacent two pipes.

As is illustrated in FIG. 9 and FIGS. 16A and B, a disk-shaped second sealing plate 50b to seal the end portion of the casing 13 is fixed to the second end cover 15 with bolts. The diameter of the second sealing plate 50b is set slightly smaller than the inner circumference of the casing 13, and a groove 50j to fit a seal 50f into a gap between the inner circumference of the casing 13 and the second sealing plate 50b is formed on the outer circumference thereof. It is noted that the second sealing plate 50b constituting part of the second end cover 15 may integrally be formed with the second end cover 15.

Second communication paths 39a and 39b penetrated in the thickness direction of the second lateral member 30 are formed from the communication sections 31, 32, 33, and 34 formed in the second lateral member 30 (see FIGS. 15A, B, and C). Furthermore, the second sealing plate 50b constituting part of the second end cover 15 is constituted of a light transmissive member in order to be capable of visually observing the rotator 40 through a sight hole 19 formed in the second end cover 15.

Specifically, a transparent or semitransparent resin plate constituted of acrylic, polycarbonate, and the like can be used for the second sealing plate 50b. It is noted that the entire second sealing plate 50b may be constituted by the light transmissive member, or only a portion corresponding to the sight hole 19 may be constituted by the light transmissive member.

Also, the sight hole 19 is formed at a position that corresponds to the communication sections 31, 32, 33, and 34 and the second communication path 39b or the second communication path 39a in the circumferential direction. In the present embodiment, the sight hole 19 is formed at a position that corresponds to the second communication path 39b on the low pressure side. This is aimed at suppressing the pressure applied to the sight hole 19 constituted by another member.

Moreover, in the present embodiment, the large diameter of the second communication paths 39a and 39b is formed, compared with the second communication paths 39a and 39b of the pressure exchange device 10 of the first embodiment, in order to be capable of visually observing the rotator 40 with ease and confirming the rotation.

As is illustrated in FIG. 9 and FIGS. 11A and B, the rotator 40 is constituted by a cylindrical member wherein the plurality of first flow paths 41, through which the first fluid flows in and flows out from one end side, and similarly, the plurality of second flow paths 42, through which the second fluid flows in and flows out from one end side, are formed and penetrated through the rotator 40 in the rotation axis direction in such a manner as to be arranged around the rotation axis. Unlike the first embodiment, the first flow paths 41 are arranged on the inner side in the radial direction of the rotator 40, and the second flow paths 42 are arranged on the outer side in the radial direction of the rotator 40.

A bearing portion is constituted by the inner circumferential surface of the retentive member 11 and the outer circumferential surface of the rotator 40, and the rotator 40 is rotatably supported by the bearing portion. Accordingly, unlike the first embodiment, the shaft portions 48a and 48b (see FIG. 2) are not formed in the first lateral member 20 and the second lateral member 30, and the bearing portions 47a and 47b (see FIG. 2) are not formed in the rotator 40. The bearing portions are portions to rotatably support the rotator and can be formed not only on the rotation axis of the rotator but also on other portions such as the outer circumferential surface of the rotator.

A groove 40f is formed on the outer circumferential surface of the rotator 40 in the circumferential direction in such a manner as to face the opening portion of the third communication path 45 formed on the circumferential surface of the retentive member 11. The first fluid and the second fluid, which enter the gap between the rotator 40 and the first lateral member 20, and the second lateral member 30, enter a gap between the retentive member 11 and the casing 13 from the gap between the retentive member 11 and the rotator 40 via the groove 40a and third communication path 45.

Accordingly, the gap between the inner circumferential surface of the retentive member 11 and the outer circumferential surface of the rotator 40 is filled with the first fluid and the second fluid. This fluids function as lubricant, whereby the rotator 40 smoothly rotates in a state where the inner circumferential surface of the retentive member 11 and the outer circumferential surface of the rotator 40 are not directly slid but separated with a distance apart.

Also, the inner circumferential surface and the outer circumferential surface of the retentive member 11 are filled with the fluid having the same pressure, which enables smooth rotation without a warp in the radial direction and without the sliding between the inner circumferential surface of the retentive member 11 and the outer circumferential surface of the rotator 40.

The support shaft 43 is inserted into the insertion portion 44 formed and penetrated though the central portion of the rotator 40 along the rotation axis, and nuts 43a and 43b to fix a screw portion formed at each end portion of the support shaft 43 as a fixation portion are respectively provided for the first enclosed space 16 that is partitioned by the first lateral member 20 and the first sealing plate 50a of the first end cover 14 and a second enclosed space 18 that is partitioned by the second lateral member 30 and the second sealing plate 50b constituting part of the second end cover 15.

A fourth communication path 49a that communicates with the first enclosed space 16 and the insertion portion 44, and a fifth communication path 49b that communicates with the second enclosed space 18 and the insertion portion 44 are formed in the support shaft 43.

The fluid that enters the insertion portion 44 via the gap between the rotator 40 and the first lateral member 20 and the fluid that enters the insertion portion 44 via the gap between the rotator 40 and the second lateral member 30 flow into the first enclosed space 16 via the fourth communication path 49a and flow into the second enclosed space 18 via the fifth communication path 49b, whereby approximately equal pressure is maintained in the first enclosed space 16, the second enclosed space 18, and the insertion portion 44.

Accordingly, the pressure balance of the bilateral surface is maintained at a portion that partitions the first enclosed space 16 of the first lateral member 20, which prevents the occurrence of a warp. The pressure balance of the bilateral surface is maintained at a portion that partitions the second enclosed space 18 of the second lateral member 30, which prevents the occurrence of a warp.

The fourth communication path 49a formed in the support shaft 43 is configured such that one end is opened to the first enclosed space 16 with respect to the end portion in the axial direction of the support shaft 43, and the other end is opened to the insertion portion 44 in the radial direction of the outer circumferential portion of the support shaft 43, and the one end and the other end of the fourth communication path 49a are communicated through the inside of the support shaft 43. The fifth communication path 49b formed in the support shaft 43 is similarly configured.

Figures 17A, 17B:
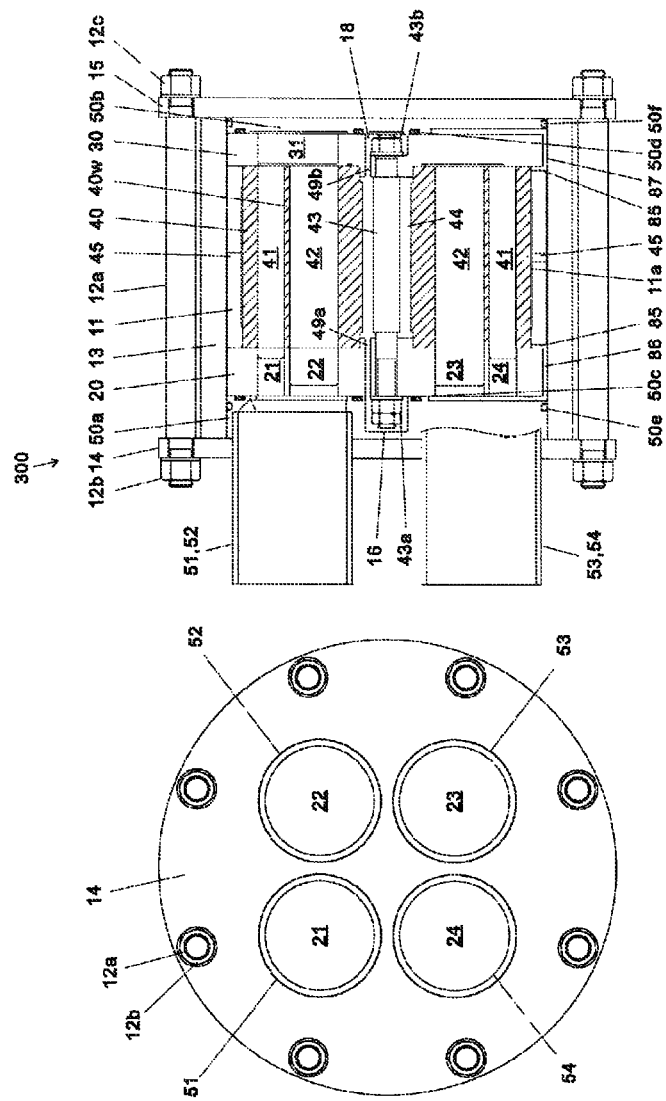
FIG. 17A is a front view of the pressure exchange device illustrating a third embodiment.
FIG. 17B is a side sectional elevation of the pressure exchange device.
Figure 22:
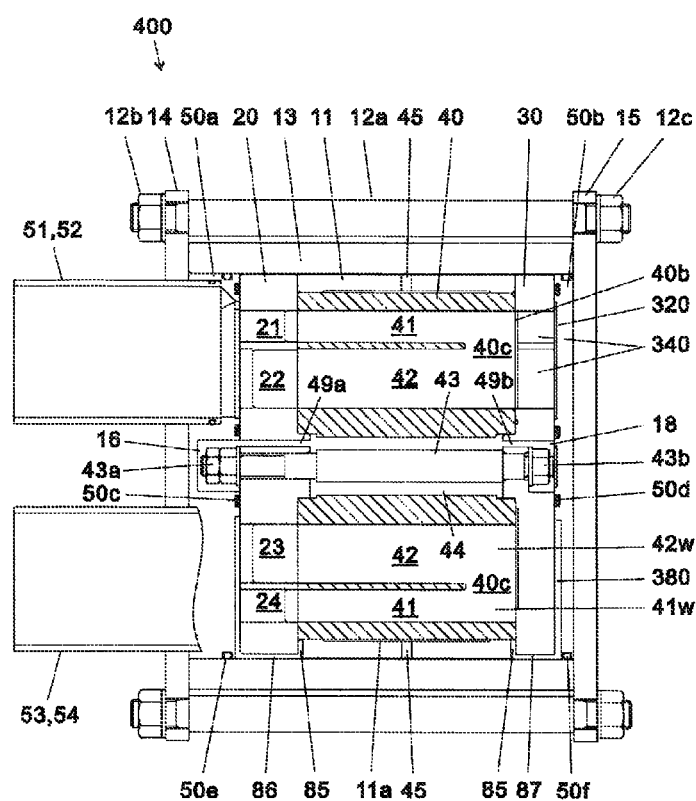
FIG. 22 is an explanatory view of the pressure exchange device illustrating a fourth embodiment.

The fourth communication path 49a and the fifth communication path 49b are not necessarily formed in the support shaft 43, but may be constituted by a penetration path formed in the thickness direction thereof in the first lateral member 20 and the second lateral member 30, as long as the first enclosed space 16 and the insertion portion 44 are communicated, and the second enclosed space 18 and the insertion portion 44 are communicated, for example, as illustrated in FIG. 17B and FIG. 22.

As is illustrated in FIGS. 13A, B, and C, a first pressure area 61a, a second pressure area 62a, a third pressure area 63a, and a fourth pressure area 64a are formed on the end surface of the first lateral member 20, which faces the rotator 40.

The first pressure area 61a is an area that receives the pressure of the high pressure concentrated seawater Hi supplied from the first fluid inflow path 21. The second pressure area 62a is an area that receives the pressure of the low pressure seawater Li supplied from the second fluid inflow path 23.

Also, the third pressure area 63a is an area that receives the pressure of the high pressure seawater Ho, in which pressure has been exchanged for the pressure of the high pressure concentrated seawater Hi. The fourth pressure area 64a is an area that receives the pressure of the low pressure concentrated seawater Lo, in which pressure has been exchanged for the pressure of the low pressure seawater Li.

A first pressure control area 61b, a second pressure control area 62b, a third pressure control area 63b, and a fourth pressure control area 64b are respectively partitioned on an end surface of the first lateral member 20, which faces the first sealing plate 50a (the first end cover 14), in order to counter the pressure of these pressure areas 61a, 62a, 63a, and 64a (see FIG. 12C).

A recessed portion is formed in the first sealing plate 50a in such a manner that the first pressure control area 61b is partitioned in a peripheral area of the opening portion of the first fluid inflow path 21 and in an area approximately corresponding to the first pressure area 61a, and that the second pressure control area 62b is partitioned in a peripheral area of the opening portion of the second fluid inflow path 23 and in an area approximately corresponding to the second pressure area 62a.

Also, the recessed portion is formed in the first sealing plate 50a in such a manner that the third pressure control area 63b is partitioned in a peripheral area of the opening portion of the second fluid outflow path 22 and in an area approximately corresponding to the third pressure area 63a, and that the fourth pressure control area 64b is partitioned in a peripheral area of the opening portion of the first fluid outflow path 24 and in an area approximately corresponding to the fourth pressure area 64a.

In FIG. 13A, fan-shaped areas corresponding to the first pressure control area 61b, the second pressure control area 62b, the third pressure control area 63b, and the fourth pressure control area 64b are respectively illustrated by the dashed line. In FIG. 13C, areas corresponding to the first pressure area 61a, the second pressure area 62a, the third pressure area 63a, and the fourth pressure area 64a are respectively illustrated in a fan shape by the dashed line.

It is noted that the pressure areas 61a, 62a, 63a, and 64a are not clearly partitioned as the fan-shaped area actually illustrated by the dashed line in the diagram but are represented by an area corresponding to the fan-shaped area partitioned as respective pressure control areas 61b, 62b, 63b, and 64b approximately illustrated by the dashed line in FIG. 13A.

As is illustrated in FIGS. 12A, B, and C, on the facing surface of the first sealing plate 50a with respect to the first lateral member 20, there are formed the respective opening portions of the first fluid inflow port 25, the second fluid outflow port 26, the second fluid inflow port 27, and the first fluid outflow port 28, and a groove 50g into which a first gasket 50c to partition a recessed portion 16a formed in the center is fitted.

Figure 14A:
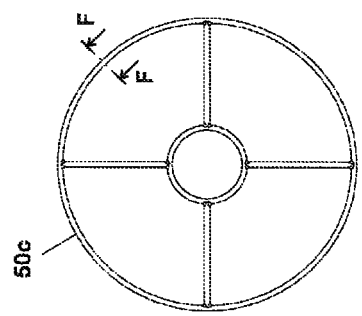
FIG. 14A is an explanatory view of a first gasket.

In FIG. 14A, the first gasket 50c is illustrated. As is illustrated in FIG. 14C, the first gasket 50c is configured such that its cross section is formed in a semi-cylindrical shape (hog-backed shape). This is aimed at reducing a reaction force from the first gasket 50c and suppressing the deformation of the first lateral member 20 and the first end cover 14 when a rotator unit inclusive of the first lateral member 20 is mounted in the casing 13 and the first end cover 14.

The rectangular bottom portion of the first gasket 50c is fitted into the groove 50g of the first sealing plate 50a, and its upper arc side is arranged in such a manner as to be brought into contact with the first lateral member 20. It is noted that the cross-sectional shape of the first gasket 50c is not limited to the semi-cylindrical shape as long as the reaction force can be reduced, and shapes such a circle, an arc, and a polygon can be adopted. Also, the gasket may be formed in a sheet shape.

When the first sealing plate 50a and the first lateral member 20 are oppositely arranged, the first pressure control area 61b, the second pressure control area 62b, the third pressure control area 63b, the fourth pressure control area 64b, and the first enclosed space 16 are formed and partitioned by the first gasket 50c in a state of being hermetically sealed to each other.

Upon the operation of the pressure exchange device 200, the pressure of the high pressure concentrated seawater Hi supplied from the first fluid inflow path 21 is applied to the first pressure area 61a of the first lateral member 20, and the pressure of the low pressure seawater Li supplied from the second fluid inflow path 23 is applied to the second pressure area 62a. Also, the pressure of the high pressure seawater Ho, in which pressure has been exchanged for the pressure of the high pressure concentrated seawater Hi, is applied to the third pressure area 63a, and the pressure of the low pressure concentrated seawater Lo, in which pressure has been exchanged for the pressure of the low pressure seawater Li, is applied to the fourth pressure area 64a. That is, an energization force directed to the first end cover 14 is applied to the first lateral member 20.

It is configured in such a manner that the pressure of the fluids is applied to the first pressure control area 61b, the second pressure control area 62b, the third pressure control area 63b, and the fourth pressure control area 64b, which are partitioned by the first gasket 50c, in order to counter the energization force.

As is illustrated in FIGS. 15A, B, and C, a fifth pressure area 65a, a sixth pressure area 66a, and a seventh pressure area 67a are formed on the end surface of the second lateral member 30, which faces the rotator 40.

The fifth pressure area 65a is an area that receives the pressure of the high pressure concentrated seawater Hi supplied from the first fluid inflow path 21 and the pressure of the high pressure seawater Ho, in which pressure has been exchanged for the pressure of the high pressure concentrated seawater Hi.

The sixth pressure area 66a is an area that receives the pressure of the low pressure seawater Li supplied from the second fluid inflow path 23 and the fifth pressure area 65a and the pressure of the low pressure concentrated seawater Lo, in which pressure has been exchanged for the pressure of the low pressure seawater Li.

The seventh pressure area 67a is an area disposed between the fifth pressure area 65a and the sixth pressure area 66a to receive an intermediate pressure between the pressure of the high pressure concentrated seawater Hi supplied from the first fluid inflow path 21 and the pressure of the low pressure seawater Li supplied from the second fluid inflow path 23.

Specifically, the fifth pressure area 65a is an area that includes the communication sections 31 and 32 formed in the second lateral member 30 and the partition w therebetween, and the sixth pressure area 66a is an area that includes the communication sections 33 and 34 and the partition w therebetween.

A recessed portion on the second sealing plate 50b is formed on the end surface of the second lateral member 30, which faces the second sealing plate 50b in such a manner that a fifth pressure control area 65b, a sixth pressure control area 66b, and a seventh pressure control area 67b are respectively partitioned, in order to counter the pressure applied to the pressure areas 65a, 66a, and 67a.

The fifth pressure control area 65b is partitioned as an area approximately corresponding to the fifth pressure area 65a, and the sixth pressure control area 66b is partitioned as an area approximately corresponding to the sixth pressure area 66a, and the seventh pressure control area 67b is partitioned as an area approximately corresponding to the seventh pressure area 67a.

In FIG. 15C, fan-shaped areas corresponding to the fifth pressure control area 65b, the sixth pressure control area 66b, and the seventh pressure control area 67b are respectively illustrated by the dashed line. In FIG. 15A, areas corresponding to the fifth pressure area 65a, the sixth pressure area 66a, and the seventh pressure area 67a are respectively illustrated in a fan shape by the dashed line.

It is noted that the respective pressure areas 65a, 66a, and 67a are not clearly partitioned as the fan-shaped area actually illustrated by the dashed line in the diagram but are represented by an area corresponding to the fan-shaped area partitioned as respective pressure control areas 65b, 66b, and 67b approximately illustrated by the dashed line in FIG. 15C.

As is illustrated in FIGS. 16A and B, on the facing surface of the second sealing plate 50b with respect to the second lateral member 30, there is formed a groove 50h into which a second gasket 50d is fitted that partitions the fifth pressure control area 65b, the sixth pressure control area 66b, and the seventh pressure control area 67b and a recessed portion 18a. Also, the portions of the fifth pressure control area 65b and the sixth pressure control area 66b are formed in a shallow concave shape.

In the present embodiment, the first to sixth pressure control areas are partitioned and formed by the recessed portion and the gasket, but the first to sixth pressure control areas may be partitioned only by the gasket without forming the recessed portion.

Figure 14B:
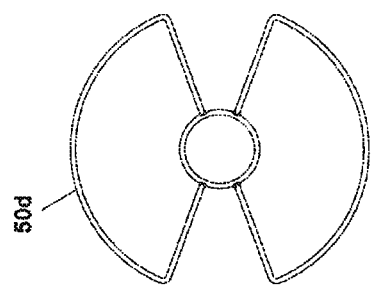
FIG. 14B is an explanatory view of a second gasket.
Figure 14C:
FIG. 14C is a cross-sectional view taken along the line F-F illustrated in FIG. 14A.

In FIG. 14B, the second gasket 50d is illustrated. The cross section of the second gasket 50d is also configured to be formed in the same semi-cylindrical shape (hog-backed shape) as the cross section of the first gasket 50c illustrated in FIG. 14C. This is aimed at reducing a reaction force from the second gasket 50d and suppressing the deformation of the second lateral member 30 and the second end cover 15 when a rotator unit inclusive of the second lateral member 30 is mounted in the casing 13 and the first end cover 14, and the second end cover is assembled.

The rectangular bottom portion of the second gasket 50d is fitted into the groove 50h of the second sealing plate 50b, and its upper arc side is arranged in such a manner as to be brought into contact with the second lateral member 30. It is noted that the cross-sectional shape of the second gasket 50d is not limited to the semi-cylindrical shape as long as the reaction force can be reduced, and shapes such a circle, an arc, and a polygon can be adopted. Also, the gasket may be formed in a sheet shape.

When the second sealing plate 50b is arranged opposite to the second lateral member 30, the fifth pressure control area 65b, the sixth pressure control area 66b, the seventh pressure control area 67b, and the second enclosed space 18 are formed and partitioned by the second gasket 50d.

The high pressure concentrated seawater Hi supplied from the first fluid inflow path 21 and the high pressure seawater Ho, in which pressure has been exchanged for the pressure of the high pressure concentrated seawater Hi, enter the fifth pressure control area 65b via the second communication path 39a formed in the communication sections 31 and 32 of the second lateral member 30. The low pressure seawater Li supplied from the second fluid inflow path 23 and the low pressure concentrated seawater Lo, in which pressure has been exchanged for the pressure of the pressure seawater Li enter the fifth pressure control area 66b via the second communication path 39b formed in the communication sections 33 and 34. It is noted that, in the present invention, the second communication paths 39a and 39b are respectively formed at two places but may be formed at one place or may be formed at plural places such as three places or more.

The diameter of the second lateral member 30 is set slightly smaller than the inner diameter of the casing 13. Accordingly, the fluid having the intermediate pressure between the pressure of the high pressure concentrated seawater Hi supplied from the first fluid inflow path 21 and the pressure of the low pressure seawater Li supplied from the second fluid inflow path 23 enters the seventh pressure control area 67b from the gap formed between the outer circumference of the second lateral member 30 and the inner circumference of the casing 13.

Upon the operation of the pressure exchange device 200, the pressure of the high pressure concentrated seawater Hi supplied from the first fluid inflow path 21 and the pressure of the high pressure seawater Ho, in which pressure has been exchanged for the pressure of the high pressure concentrated seawater Hi, are applied to the fifth pressure area 65a of the second lateral member 30.

Similarly, the pressure of the low pressure seawater Li supplied from the second fluid inflow path 23 and the pressure of the low pressure concentrated seawater Lo, in which pressure has been exchanged for the pressure of the low pressure seawater Li are applied to the sixth pressure area 66a.

Also, the intermediate pressure between the pressure of the high pressure concentrated seawater Hi supplied from the first fluid inflow path 21 and the pressure of the low pressure seawater Li supplied from the second fluid inflow path 23 is applied to the seventh pressure area 67a between the fifth pressure area 65a and the sixth pressure area 66a. That is, an energization force directed to the second end cover 15 is applied to the second lateral member 30.

It is configured in such a manner that the pressure of the fluids is applied to the fifth pressure control area 65b, the sixth pressure control area 66b, and the seventh pressure control area 67b, which are partitioned by the second gasket 50d, in order to counter the energization force.

As is illustrated in FIGS. 15A, B, and C, communication grooves 68 and 69 are formed on the end surface of the second lateral member 30, respectively between the communication sections 31 and 34 and between the communication sections 32 and 33. The communication grooves 68 and 69 are formed of a groove having a width of about several millimeters and a depth of about several millimeters.

The communication grooves 68 and 69 are arranged between the communication sections 31 and 34 and between the communication sections 32 and 33, thereby alleviating large pressure fluctuation of a case where the high pressure fluid in the first flow paths 41 or the second flow paths 42 enters the communication section inclusive of the low pressure fluid, or alleviating large pressure fluctuation of a case where the low pressure fluid enters the communication section inclusive of the high pressure fluid, with the rotation of the rotator 40. Accordingly, the cavitation due to the exponential change of the pressure can be prevented.

Also, the difference of the water pressure applied to the partitions 41w and 42w (see FIGS. 11A and B) of the rotator 40 is reduced, and the apprehension of the damage of the rotator 40 is allayed, and the thickness of the partitions 41w and 42w (see FIGS. 11A and B) can be reduced, and the reduction in weight and the enhancement of capacity can be achieved. This is because the high pressure fluid, disposed on the opposite side in the radial direction of the first flow paths 41 and the second flow paths 42 of the rotator 40, communicates with the low pressure fluid via the communication grooves 68 and 69, whereby the pressure is equalized.

In the communication grooves 68 and 69, grooves 68a and 69a extended in the direction opposite to the rotational direction of the rotator 40 are formed at positions corresponding to the first flow paths 41 of the rotator 40. Similarly, in the communication grooves 68 and 69, grooves 68b and 69b extended in the direction opposite to the rotational direction of the rotator 40 are formed at positions corresponding to the second flow paths 42 of the rotator 40.

The first flow paths 41 and the second flow paths 42 of the rotator 40 starts communicating with the grooves 68a and 69a and the grooves 68b and 69b before communicating with the communication grooves 68 and 69, and after the pressure fluctuation is alleviated to some extent, the first flow paths 41 and the second flow paths 42 communicate with the communication grooves 68 and 69. Accordingly, the pressure fluctuation can smoothly be alleviated, compared with the constitution where the first flow paths 41 and the second flow paths 42 directly communicate with the communication grooves 68 and 69.

It may be such that the seventh pressure area 67a is assumed in such manner as to have the intermediate pressure formed in the second lateral member 30 between the high pressure areas inclusive of the first pressure area 61a and the third pressure area 63a and low pressure areas inclusive of the second pressure area 62a and the fourth pressure area 64a illustrated in FIGS. 13A, B, and C, and accordingly, the pressure control area of intermediate pressure corresponding to the seventh pressure control area 67b is formed and partitioned.

In this case, the pressure control area of intermediate pressure and of approximately the same shape as that of the seventh pressure control area 67b in FIG. 15C is partitioned between the pressure control areas 61b and 63b and the pressure control areas 62b and 64b partitioned on the end surface of the first lateral member 20, which faces the first sealing plate 50a (the first end cover 14) illustrated in FIG. 13A, and the first gasket 50c corresponding to the pressure control area is used, and the groove 50g in which the first gasket 50c is fitted is formed in the first sealing plate 50a (the first end cover 14).

The diameter of the first lateral member 20 is set slightly smaller than the inner diameter of the casing 13, so that the fluid having the intermediate pressure obtained by averaging the high pressure and the low pressure enters the pressure control area of the intermediate pressure from the gap between the outer circumference of the first lateral member 20 and the inner circumference of the casing 13.

Also, it may be configured such that a communication groove communicating with the seventh pressure control area 67b and/or the pressure control area of the intermediate pressure is formed on the outer circumferential portions of the first lateral member 20 and the second lateral member 30 and the inner circumferential portion of the casing, and the fluid having the intermediate pressure is guided to the seventh pressure control area 67b and/or the pressure control area of the intermediate pressure via the communication groove.

The procedures of the assembling, adjustment, and inspection of this pressure exchange device 200 will be described. The pressure exchange device 200 is installed in such a manner that the rotation axis of the rotator 40 is positioned horizontally or vertically, but at the time of assembling, the first end cover 14 side is disposed as a bottom surface side, and the assembly is carried out in a manner as to pile up components in order from the first end cover 14 in a posture in which the rotation axis of the rotator 40 is directed in the perpendicular direction.

Specifically, first, the casing 13 is fixed with bolts to the first end cover 14 in which the first sealing plate 50a is fixed with bolts, and a plurality of bolts 12a that are fixed with nuts 12b on the peripheral portion of the first end cover 14 are vertically arranged.

A rotator unit is constituted such that the first lateral member 20 and the second lateral member 30 are arranged at the bilateral sides of the retentive member 11 that stores the rotator 40, and the support shaft 43 is inserted into the insertion portion 44 of the rotator 40, and both ends of the support shaft 43 are tightened by the nuts 43a and 43b.

A bar-like jig is inserted into the communication section 33 and the second communication path 39b of the second lateral member 30 constituting the rotator unit, and the smooth rotation of the rotator 40 is confirmed. If the rotator 40 is not smoothly rotated, the assembly of the rotator unit is readjusted.

It is noted that, in the first embodiment, the hole of the second communication path 39b is small, so that the rotation of the rotator 40 cannot be confirmed by inserting the jig. In the second embodiment, the hole is large enough to confirm the rotation of the rotator 40.

The rotator unit to which the adjustment is completed is lifted by a hoist and stored from the upper opening of the casing 13, which has been assembled in advance, into the inside of the casing 13. Subsequently, the end surface of the upper opening of the casing 13 is sealed with the second sealing plate 50b, on which the second end cover 15 is mounted.

Lastly, the second sealing plate 50b and the second end cover 15 are fixed with bolts, and the bolts 12a, which are vertically arranged in the peripheral portion of the first end cover 14, are penetrated through the bolt holes formed in the peripheral portion of the second end cover 15 and fastened by the nuts 12b, whereby the pressure exchange device 200 is completed.

When the pressure exchange device 200 is operated, the situation of the rotation of the rotator 40 can be visually observed from the outside of the pressure exchange device 200, through the sight hole 19 formed in the second end cover 15, the second sealing plate 50b, the communication section 33 formed in the second lateral member 30, and second communication path 39b. Accordingly, malfunctions such as the rotation failure of the rotator 40 can be extremely easily detected.

In the present embodiments, the bearing portion is constituted by the inner circumferential surface of the retentive member 11 and the outer circumferential surface of the rotator 40, so that the support shaft 43 can be omitted. However, the assembly of the rotator unit is adjusted by the support shaft 43 in advance, and the rotator unit can be stored in the casing 13, thereby improving the workability in the operations of assembly and adjustment.

Next, the third embodiment of the pressure exchange device will be described. In the description below, constitution that is different from that of the first and second embodiments will be mainly described in detail, and the same constitution as that of the first or second embodiment is simplified. It is noted that the same members in FIGS. 17A and B to FIGS. 21A, B and C, which illustrate the third embodiment, are designated as the same reference numbers of the first or second embodiment.

As is illustrated in FIGS. 17A and B, a pressure exchange device 300 of the third embodiment, which is similar to the first embodiment, includes the rotator 40, and the first lateral member 20 and the second lateral member 30 that are arranged on the bilateral sides of the rotator 40 in such a manner as to sandwich the rotator 40 and rotatably sandwich the rotator 40, and the tubular retentive member 11 arranged in such a manner as to cover the peripheral portion of the rotator 40 between the first lateral member 20 and the second lateral member 30.

Furthermore, the tubular casing 13 is provided that stores the first lateral member 20, the second lateral member 30, and the retentive member 11, and in the casing 13, there are included the first end cover 14 that seals one end surface on the first lateral member 20 side and the second end cover 15 that seals the other end surface on the second lateral member 30 side, and the like.

Then, the inflow pipe 51 of the high pressure concentrated seawater Hi, the outflow pipe 52 of the high pressure seawater Ho, the inflow pipe 53 of the low pressure seawater Li, and the outflow pipe 54 of the low pressure concentrated seawater Lo are connected to the first end cover 14.

The high pressure concentrated seawater Hi, which flows from the inflow pipe 51 into the first flow paths 41 of the rotator 40 via the first fluid inflow path 21, and the low pressure seawater Li, which flows from the inflow pipe 53 into the second flow paths 42 of the rotator 40 via the second fluid inflow path 23 and has completed the pressure exchange with the low pressure concentrated seawater Lo in the first flow paths 41, are communicated through the communication sections 31 and 32 (see FIG. 19A), whereby the pressure exchange is performed. As a result, the high pressure seawater Ho flows out from the outflow pipe 52 via the second fluid outflow path 22.

Similarly, the low pressure seawater Li, which flows from the inflow pipe 53 into the second flow paths 42 of the rotator 40 via the second fluid inflow path 23, and the low pressure concentrated seawater Lo, which flows from the inflow pipe 51 into the first flow paths 41 of the rotator 40 via the first fluid inflow path 21 and has completed the pressure exchange with the low pressure seawater Li in the second flow paths 42, are communicated through the communication sections 33 and 34 (see FIG. 19A), whereby the pressure exchange is performed. As a result, the low pressure concentrated seawater Lo flows out from the outflow pipe 54 via the first fluid outflow path 24.

That is, unlike the second embodiment, the first flow paths 41 are arranged on the outer side in the radial direction of the rotator 40, and the second flow paths 42 are arranged on the inner side in the radial direction of the rotator 40.

The first lateral member 20 is illustrated in FIGS. 18A, B and C. In the present embodiment, the first pressure area 61a, the second pressure area 62a, the third pressure area 63a, and the fourth pressure area 64a are formed on the end surface of the first lateral member 20, opposite to the rotator 40. Furthermore, an intermediate pressure area 67c is formed between the first pressure area 61a and the third pressure area 63a, and the second pressure area 62a and the fourth pressure area 64a.

As is the same case with the second embodiment, the first pressure area 61a is an area that receives the pressure of the high pressure concentrated seawater Hi supplied from the first fluid inflow path 21. The second pressure area 62a is an area that receives the pressure of the low pressure seawater Li supplied from the second fluid inflow path 23.

Also, the third pressure area 63a is an area that receives the pressure of the high pressure seawater Ho, in which pressure has been exchanged for the pressure of the high pressure concentrated seawater Hi. The fourth pressure area 64a is an area that receives the pressure of the low pressure concentrated seawater Lo, in which pressure has been exchanged for the pressure of the low pressure seawater Li.

The intermediate pressure area 67c is an area to which intermediate pressure is applied, wherein the high pressure fluid applied to the pressure areas 61a and 63a of the high pressure and the low pressure fluid applied to the pressure areas 62a and 64a are mixed.

The first pressure control area 61b, the second pressure control area 62b, the third pressure control area 63b, the fourth pressure control area 64b, and an intermediate pressure control area 67d are respectively partitioned on the end surface of the first lateral member 20, which faces the first sealing plate 50a (the first end cover 14) in order to counter the pressure of these pressure areas 61a, 62a, 63a, 64a, and 67c.

In FIGS. 20A, B and C, the first gasket 50c or the like is illustrated that is fitted into the groove 50g formed in the first end cover 14 and the first sealing plate 50a. It is noted that mode may be applied where the groove 50g into which the first gasket 50c is fitted is formed in the first lateral member 20, or mode may be applied where the groove 50g is not formed at any portion.

The first pressure control area 61b, the second pressure control area 62b, the third pressure control area 63b, the fourth pressure control area 64b, and the intermediate pressure control area 67d are partitioned by the first gasket 50c. Also, a portion of the first gasket 50c, corresponding to the intermediate pressure control area 67d, is opened in the radial direction, and a first open space 270 is formed on the end surface of the first lateral member 20, which faces the first sealing plate 50a (the first end cover 14) by means of the first gasket 50c. It is noted that a recessed portion to secure the pressure of the pressure control area may be formed on the inner circumferential side of the gasket.

As is illustrated in FIGS. 18A, B, and C, a sixth communication path 86 is formed on the outer circumferential portion of the first lateral member 20 in the thickness direction. Also, as is illustrated in FIG. 17B, an eighth communication path 85 is formed at the end surface of the opening of the retentive member 11 in such a manner as to communicate with the sixth communication path 86.

The fluid in the intermediate pressure area 67c formed in the gap between the first lateral member 20 and the rotator 40 is guided to the intermediate pressure control area 67d, which serves as the first open space 270, via the above-mentioned eighth communication path 85 and sixth communication path 86, whereby the pressure balance is maintained in the intermediate pressure area 67c and the intermediate pressure control area 67d.

It is noted that, when the fluid in the intermediate pressure area 67c is guided to the sixth communication path 86 from the gap between the first lateral member 20 and the rotator 40, it is not necessary to form the eighth communication path 85 in the retentive member 11. Also, in place of the mode where the sixth communication path 86 is formed in a groove shape on the outer circumferential portion of the first lateral member 20, the hole-shaped sixth communication path 86 that communicates with the intermediate pressure area 67c and the intermediate pressure control area 67d may be formed in the first lateral member 20, and further, the groove-shaped sixth communication path 86 may be formed on the inner circumferential surface of the casing 13.

In FIGS. 19A, B, and C, the second lateral member 30 is illustrated, and in FIGS. 21A, B, and C, the second gasket 50d or the like, which is fitted into the groove 50h formed in the second end cover 15 and the second sealing plate 50d, is illustrated. It is noted that the mode may be applied where the groove 50h in which the second gasket 50d is fitted is formed in the second lateral member 30, or the mode may be applied where the groove 50h is not formed at any portion.

It is noted that the grooves similar to the grooves 68a, 68b, 69a, and 69b extended in the direction opposite to the rotational direction of the rotator 40 and illustrated in FIG. 15A of the second embodiment may be formed in the communication grooves 37a and 37b formed in the second lateral member 30.

In the present embodiment, the communication sections 31, 32, 33, and 34 formed in the second lateral member 30 are formed in such a manner as to completely penetrate the second lateral member 30 in the thickness direction.

Also, as is the same with the second embodiment, the fifth pressure area 65a, the sixth pressure area 66a, and the seventh pressure area 67a are formed on the end surface of the second lateral member 30, which faces the rotator 40. The fifth pressure control area 65b, the sixth pressure control area 66b, and the seventh pressure control area 67b are respectively partitioned on the end surface of the second lateral member 30, which faces the second sealing plate 50b, in order to counter the pressure applied to the pressure areas 65a, 66a, and 67a.

The fifth pressure control area 65b, the sixth pressure control area 66b, and the seventh pressure control area 67b are respectively partitioned by the second gasket 50d. Also, a portion of the second gasket 50d, corresponding to the seventh pressure control area 67b, is opened in the radial direction, and a second open space 380 is formed on the end surface of the second lateral member 30, which faces the second sealing plate 50b (the second end cover 15) by means of this gasket 50b.

Furthermore, in the second sealing plate 50b, recessed portions 320 and 330 (see FIG. 21A) are formed in areas respectively corresponding to the fifth pressure control area 65b and the sixth pressure control area 66b in order to receive the fluid that flows from the communication sections 31 and 32 and the communication sections 33 and 34 and apply the pressure to the end surface of the second lateral member 30. The thickness of the recessed portions 320 and 330 is arbitrary. It is noted that, when a sufficient space is formed on the end surface of the second lateral member 30, which faces the second sealing plate 50b by means of the second gasket 50d, it is not necessary to form the recessed portions 320 and 330.

In the present embodiment, unlike the second embodiment, a seventh communication path 87 is formed on the outer circumferential portion of the second lateral member 30 in the thickness direction thereof. Also, as is illustrated in FIG. 17B, the eighth communication path 85 is formed at the end surface of the opening of the retentive member 11 in such a manner as to communicate with the seventh communication path 87.

The fluid in the seventh pressure area 67a formed in the gap between the second lateral member 30 and the rotator 40 is guided to the seventh pressure control area 67b, which serves as the second open space 380, via the above-mentioned eighth communication path 85 and seventh communication path 87, whereby the pressure balance is maintained in the seventh pressure area 67a and the seventh pressure control area 67b.

It is noted that, when the fluid in the seventh pressure area 67a is guided from the gap between the second lateral member 30 and the rotator 40 to the seventh communication path 87, it is not necessary to form the eighth communication path 85 in the retentive member 11. Also, in place of the mode where the seventh communication path 87 is formed in a groove shape in the second lateral member 30, the hole-shaped seventh communication path 87 that communicates with the seventh pressure area 67a and the seventh pressure control area 67b may be formed in the inner circumferential portion of the second lateral member 30. Moreover, the groove-shaped seventh communication path 87 may be formed on the inner circumferential surface of the casing 13.

As is illustrated in FIG. 17B, a circumferentially expanded area 11a whose diameter is larger than the diameter of the opening portion is formed on the inner circumferential surface on the inner side with respect to the end portion of the opening of the retentive member 11. The circumferentially expanded area 11a is communicated with the third communication path 45 formed and penetrated through the circumferential surface of the retentive member 11 in the radial direction.

The first fluid and the second fluid, which enter the gap between the rotator 40 and the first lateral member 20, and the second lateral member 30, enter the circumferentially expanded area 11a via the gap between the outer circumferential surface of the rotator 40 and the inner circumferential surface of the retentive member 11 or enter the circumferentially expanded area 11a via the gap between the outer circumferential surface of the retentive member 11 and the inner circumferential surface of casing 13, and the third communication paths 45. The fluids that enter the circumferentially expanded area 11a function as lubricant between the rotator 40 and the retentive member 11, so that the rotator 40 smoothly rotates in a state where the inner circumferential surface of the retentive member 11 and the outer circumferential surface of the rotator 40 are not directly slid but separated with a distance apart.

Next, the fourth embodiment of the pressure exchange device will be described. In the description below, constitution that is different from that of the first to third embodiments will be mainly described in detail, and the same constitution as that of any of the first to third embodiment is simplified. It is noted that the same members in FIG. 22 and FIGS. 23A and B, which illustrate the fourth embodiment, are designated as the same reference numbers of any of the first to third embodiments.

A pressure exchange device 400 of the fourth embodiment includes the rotator 40 in which the first flow paths 41 and the second flow paths 42 are configured to communicate through a communication section 40c formed on the end surface 40b side of the rotator 40. The communication section 40c functions as a pressure exchange unit that exchanges pressure between the first fluid and the second fluid, which differs from the above-described first to third embodiments in which the communication sections 31, 32, 33, and 34 are formed in the second lateral member 30.

Figure 23:
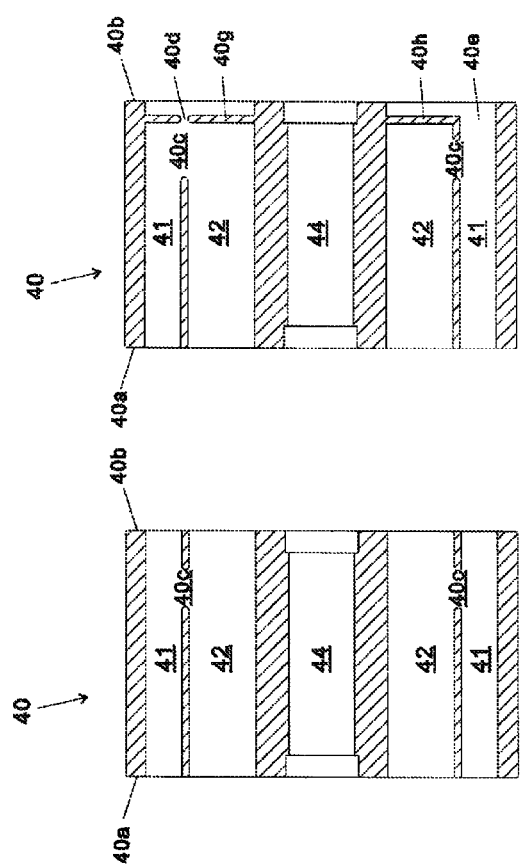
FIG. 23A is a side sectional elevation of the rotator.
FIG. 23B is a side sectional elevation of the rotator.

As is illustrated in FIG. 23A, the communication section 40c can be constituted by the opening formed in a partition between the first flow path 41 and the second flow path 42. The opening can be formed at an arbitrary position between the end surface 40a and the end surface 40b of the rotator 40.

Pressure areas similar to the first pressure area 61a, the second pressure area 62a, the third pressure area 63a, and the fourth pressure area 64a, which are described in FIGS. 12A, B, and C, and FIGS. 13A, B, and C, and FIGS. 14A and C, are formed on the end surface of the first lateral member 20, opposite to the rotator 40.

Pressure control areas similar to the first pressure control area 61b, the second pressure control area 62b, the third pressure control area 63b, and the fourth pressure control area 64b are partitioned on the end surface of the first lateral member 20 opposite to the first end cover 14, in order to counter the pressure of these pressure areas 61a, 62a, 63a, and 64a. It is noted that the constitutions of the pressure area and the pressure control area described in FIGS. 18A, B, and C, and FIGS. 20A, B, and C may be adopted in place of this constitution.

Pressure areas similar to the fifth pressure area 65a, the sixth pressure area 66a, and the seventh pressure area 67a described in FIGS. 15A, B, and C, FIGS. 16A and B, and FIGS. 14B and C are formed on the end surface of the second lateral member 30, opposite to the rotator 40.

Pressure control areas similar to the fifth pressure control area 65b, the sixth pressure control area 66b, and the seventh pressure control area 67b are respectively partitioned on the end surface of the second lateral member 30 opposite to the second end cover 15 in order to counter the pressure applied to the pressure areas 65a, 66a, and 67a.

It is noted that, in FIG. 22, a reference number 340 represents a communication path formed in the second lateral member 30, and reference numbers 320 and 380 represent the recessed portion (corresponding to the reference number 320 in FIG. 21A) formed in the second sealing plate 50b, and reference numbers 50c and 50d represent the gaskets. It is noted that, the penetration path 340 only needs to have a size approximately large enough to allow the fluid flown in the rotator 40 to guide to the second sealing plate 50b (the second end cover 15) side.

In FIG. 23B, two examples of the modification of the rotator 40 used for the pressure exchange device 400 of the fourth embodiment are illustrated. The first modification represents the constitution illustrated in the upper side area of the insertion portion 44 illustrated in the diagram and represents the mode wherein a partition 40g along the radial direction of the rotator 40 is formed on the end surface 40b side of the first flow path 41 and the second flow path 42, and the communication section 40c is formed on the end surface 40a side with respect to the partition 40g. In this mode, the pressure of the fluid is energized to the end surface 40b of the rotator 40, so that it is configured to form an opening portion 40d in the partition 40g and receive the pressure by the second lateral member opposite to the partition 40g.

The second modification represents the constitution illustrated in the lower side area of the insertion portion 44 illustrated in the diagram and represents the mode wherein the second flow path 42 is blocked by a partition 40h formed on the end surface 40b side, and the communication section 40c is formed on the end surface 40a side with respect to the partition 40h. In this mode, it is configured that the first flow path 41 is opened on the end surface 40b side, and the pressure is received by the second lateral member opposite to the end surface 40b side of the rotator 40.

Next, the fifth embodiment of the pressure exchange device will be described. In the description below, constitution that is different from that of the first to fourth embodiments will be mainly described in detail, and the same constitution as that of the first to fourth embodiment is simplified. It is noted that the same members in FIGS. 24A, B and C, which illustrate the fifth embodiment, are designated as the same reference numbers of the first to fourth embodiments.

Figure 24:
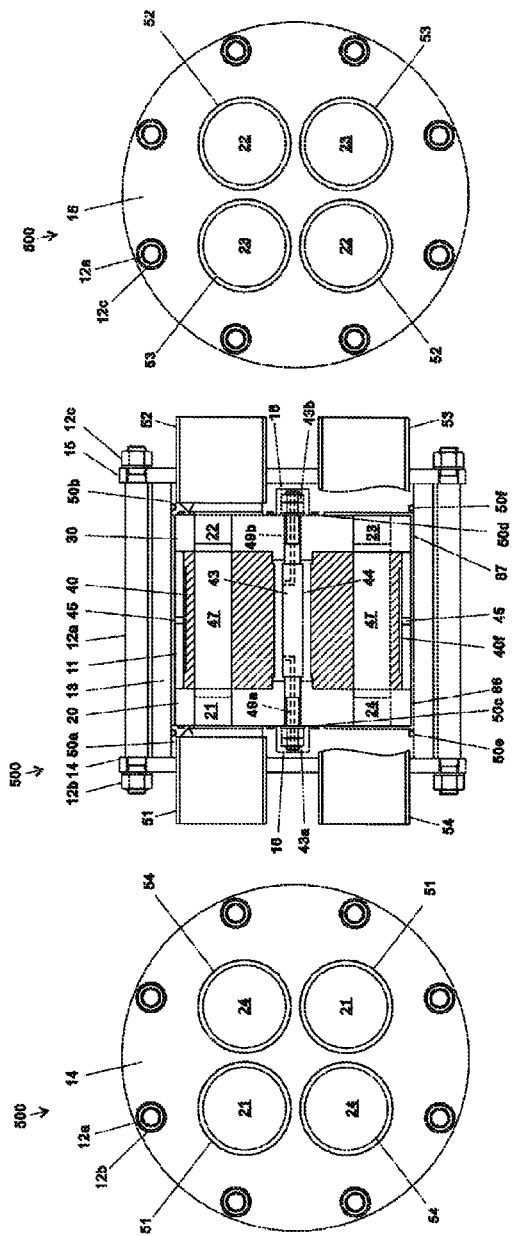
FIG. 24A is a front view of the pressure exchange device illustrating a fifth embodiment.
FIG. 24B is a side sectional elevation of the pressure exchange device.
FIG. 24C is a rear view of the pressure exchange device.
Figure 25:
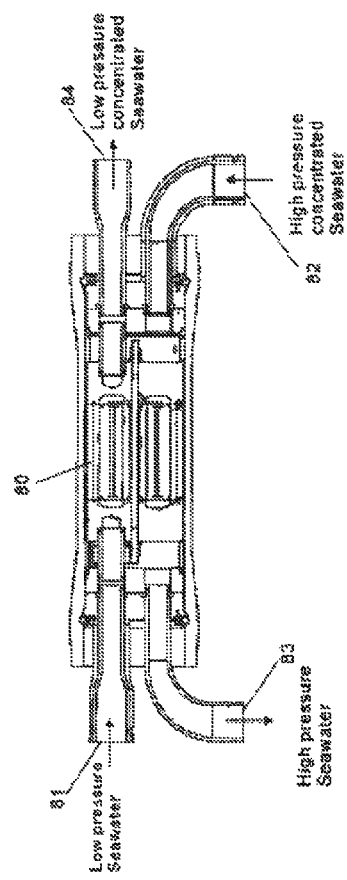
FIG. 25 is an explanatory view of a conventional pressure exchange device.
Figure 26:
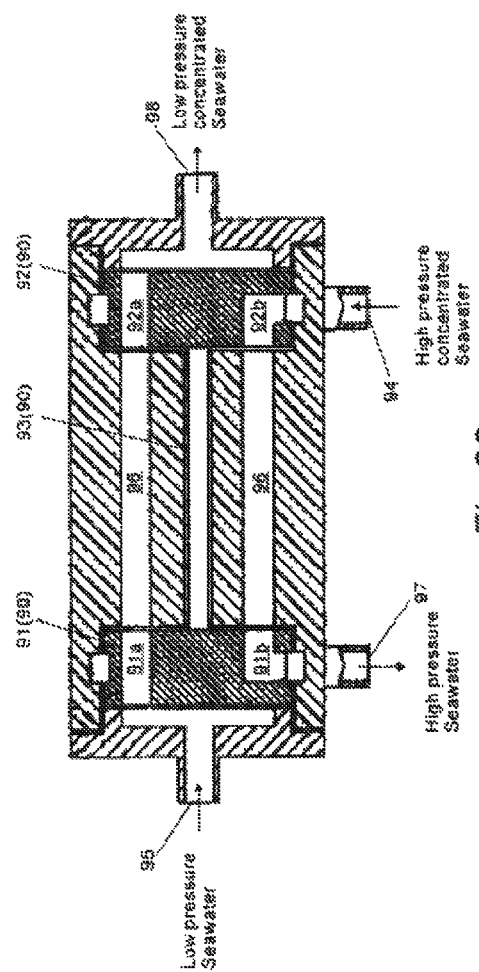
FIG. 26 is an explanatory view of the conventional pressure exchange device.
Figure 27A:
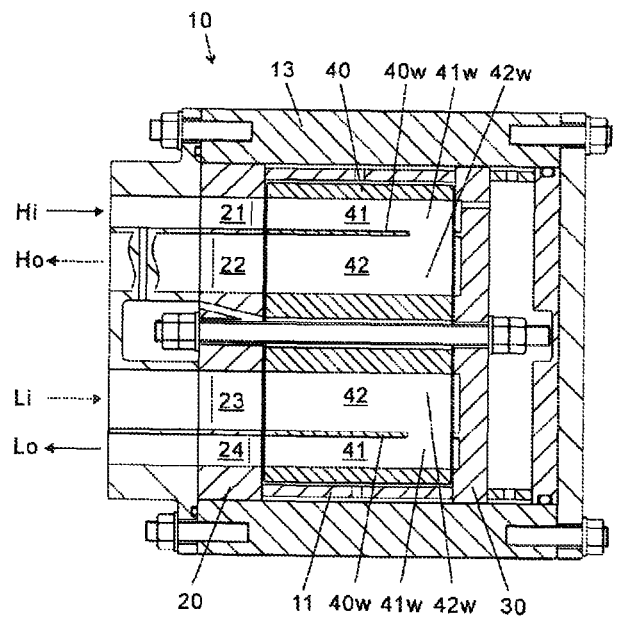
FIG. 27A is an explanatory view of the pressure exchange device.
Figure 27B:
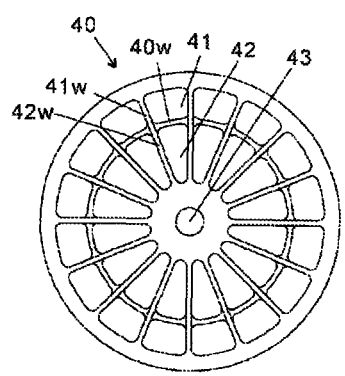
FIG. 27B is a rear view of the rotator.

In FIGS. 24A, B and C, the pressure exchange device 500 of the fifth embodiment is illustrated. The inflow pipe 51 of the high pressure concentrated seawater Hi and the outflow pipe 54 of the low pressure concentrated seawater Lo are connected to the first end cover 14, and the outflow pipe 52 of the high pressure seawater Ho and the inflow pipe 53 of the low pressure seawater Li are connected to the second end cover 15.

A plurality of flow paths 47 are radially formed and penetrated through the rotator 40 along the axial direction. With the rotation of the rotator 40, the pressure exchange is performed between the high pressure concentrated seawater Hi supplied from the inflow pipe 51 to the flow paths 47 of the rotator 40 and the low pressure seawater Li supplied from the inflow pipe 53 to the flow paths 47, and the high pressure seawater Ho is discharged from the outflow pipe 52, and the low pressure concentrated seawater Lo, in which pressure has been exchanged in a similar manner, is discharged from the outflow pipe 54.

As is similar to the second to fourth embodiments, the first pressure area 61a that receives the pressure of the high pressure concentrated seawater Hi supplied from the first fluid inflow path 21 and the fourth pressure area 64a that receives the pressure of the low pressure concentrated seawater Lo, in which pressure has been exchanged for the pressure of the low pressure seawater Li, are formed on the end surface of the first lateral member 20, opposite to the rotator 40.

Also, on the end surface of the first lateral member 20, which faces the first sealing plate 50a, the first pressure control area 61b is partitioned in a peripheral area of the opening portion of the first fluid inflow path 21 and in an area approximately corresponding to the first pressure area 61a, and the fourth pressure control area 64b is partitioned in a peripheral area of the opening portion of the first fluid outflow path 24 and in an area approximately corresponding to the fourth pressure area 64a, by means of the first gasket 50c arranged on the end surface of the first lateral member 20, which faces the first sealing plate 50a.

Accordingly, the pressure balance is maintained in the first pressure area 61a and the first pressure control area 61b with the first lateral member 20 sandwiched therebetween, and the pressure balance is maintained in the fourth pressure area 64a and the fourth pressure control area 64b with the first lateral member 20 sandwiched therebetween, thereby suppressing the occurrence of a warp in the axial direction of the first lateral member 20.

Furthermore, as is the same with the second to fourth embodiments, the second pressure area 62a that receives the pressure of the low pressure seawater Li supplied from the second fluid inflow path 23 and the third pressure area 63a that receives the pressure of the high pressure seawater Ho, in which pressure has been exchanged for the pressure of the high pressure concentrated seawater Hi, are formed on the end surface of the second lateral member 30, opposite to the rotator 40.

Also, on the end surface of the second lateral member 30, which faces the second sealing plate 50b, the second pressure control area 62b is partitioned in a peripheral area of the opening portion of the second fluid inflow path 23 and in an area approximately corresponding to the second pressure area 62a, and the third pressure control area 63b is partitioned in a peripheral area of the opening portion of the second fluid outflow path 22 and in an area approximately corresponding to the third pressure area 63a, by means of the second gasket 50d arranged on the end surface of the second lateral member 30, which faces the second sealing plate 50b.

Accordingly, the pressure balance is maintained in the second pressure area 62a and the second pressure control area 62b with the second lateral member sandwiched therebetween, and the pressure balance is maintained in the third pressure area 63a and the second pressure control area 63b with the second lateral member sandwiched therebetween, thereby suppressing the occurrence of a warp in the axial direction of the second lateral member.

Thus, even when the inflow pipe and the outflow pipe are configured to be arranged on the bilateral ends of the pressure exchange device 500, the balance of the pressure applied to the bilateral surfaces of the first lateral member 20 and the second lateral member 30 is maintained.

Hereinafter, other embodiment will be described. Needless to say, the press mechanism described in the first embodiment can be applied to the pressure exchange device of the second to fourth embodiments.

Needless to say, the torque application mechanism described in the first embodiment can be applied to the pressure exchange device of the second to fifth embodiments.

The torque application mechanism only needs to be configured to apply the torque to the rotator 40 at least based on the energy of the concentrated seawater that flows into the first flow paths 41 or flows out from the first flow paths 41, and/or the energy of the seawater that flows into the second flow paths 42 or flows out from the second flow paths 42.

In a case where only one of any of fluid energy is utilized for the generation of the torque, and the energy of the high pressure fluid that flows into the first flow paths 41 is mainly utilized, large torque is generated, which is efficient in energy.

In place of the torque application mechanism, or in addition to the torque application mechanism, other torque application mechanism may be provided wherein the rotator 40 is coupled with the driving shaft, and the rotator 40 is rotated by the external motive power such as a driving machine. When the rotator 40 is rotationally driven by the external motive power, stable rotations can be provided at all times, which improves the reliability of the device.

The structure of the bearing portion that rotatably supports the rotator 40, which is described in the second embodiment, that is, the bearing portion constituted by the inner circumferential surface of the retentive member 11 and the outer circumferential surface of the rotator 40 may be adopted in any of the first, third, and fourth embodiments.

When the cross-sectional areas of the first flow path 41 and the second flow path 42 are equalized, it is preferable in that a surplus pressure loss due to the change in the flow passage cross-sectional area can be reduced. However, it is not necessary to completely equalize the cross-sectional area of the first flow path 41 with the cross-sectional area of the second flow path 42.

The cross-sectional shape of the first flow path 41 and the second flow path 42 is not particularly limited, but circular shapes such as a circle and an ellipse, or polygonal shapes such as a triangle and a square may be applied.

Preferably, the cross-sectional shapes of the first flow path 41 and the second flow path 42, which are illustrated in FIG. 3A, provides a large open area ratio with respect to the cross section of the rotator.

The number or the cross-sectional shape of first flow paths 41 and the second flow paths 42 can be changed, thereby changing the treatment flow rate of the pressure exchange device.

In the first to fourth embodiments, the examples have been described wherein the retentive member 11 and the second lateral member 30 are separately constituted, but the retentive member 11 and the second lateral member 30 may be integrally formed in a cup shape. In this case, it may be configured that the rotator 40 is arranged in an enclosed space formed by the cup-shaped second lateral member 30 and the first lateral member 20. Similarly, the retentive member 11 and the first lateral member 20 may be integrally formed in a cup shape.

In the first to fourth embodiments, the examples have been described wherein the first end cover 14, the second end cover 15, and the casing 13 are separately constituted, but the first end cover 14 or the second end cover 15 and the casing 13 may be integrally formed.

In the first to fifth embodiments, the examples have been described wherein the retentive member 11 and the casing 13 are separately constituted, but the retentive member 11 and the casing 13 may be integrally formed. Also, the retentive member may be functioned as the casing without the provision of the casing 13.

In the first to fourth embodiments, the constitution has been described wherein the high pressure concentrated seawater is flown into the first fluid inflow path, and the low pressure seawater, which is a concentration target fluid, is flown into the second fluid inflow path, but it may be such that the low pressure seawater, which is a concentration target fluid, is flown into the first fluid inflow path, and the high pressure concentrated seawater is flown into the second fluid inflow path.

In the first to fourth embodiments, the examples have been described wherein the pair of inflow path and outflow path for the high pressure fluid and the low pressure fluid is respectively, integrally formed in the first lateral member 20, but the two pairs or more may be formed. In this case, preferably, each inflow path and each outflow path are arranged in a point symmetry around the rotation axis in order to secure the pressure balance of the fluid that flows into the rotator 40 or flows out from the rotator 40.

Needless to say, the constitution described in the second to fourth embodiments, in which the pressure balance of the first lateral member and the second lateral member is maintained, can be applied to the first embodiment. That is, it is configured that each pressure control area is formed and partitioned on the facing surface side of the first lateral member or the second lateral member, corresponding to the each pressure area that is formed on the facing surfaces of the first lateral member with respect to the rotator and on the facing surfaces of the second lateral member with respect to the rotator, thereby maintaining the pressure balance of the first lateral member and the second lateral member.

It is possible to mutually combine the constitution of each unit of the pressure exchange device described in the first to fifth embodiments, within the scope in which the functions and effects of the present invention are provided.

Needless to say, the concrete constitution of the above-described pressure exchange device is not limited to the description of the embodiments above, but the shape, size, material, and the like are appropriately selectable within the scope in which the functions and effects of the present invention are provided.

DESCRIPTION OF SYMBOLS

6: reverse osmosis membrane device
10: pressure exchange device
11: retentive member
13: casing
14: first end cover
15: second end cover
16: first enclosed space
17: first communication path
18: second enclosed space
19: sight hole
20: first lateral member
21: first fluid inflow path
22: second fluid outflow path
23: second fluid inflow path
24: first fluid outflow path
30: second lateral member
31, 32, 33, 34: communication section
40: rotator
41: first flow path
42: second flow path
43: support shaft
44: insertion portion
45: third communication path
61a to 67a: first to seventh pressure area
61b to 67b: first to sevens pressure control area
67c: intermediate pressure area
67d: intermediate pressure control area
Hi: high pressure concentrated seawater (concentrated fluid)
Li: low pressure seawater (concentration target fluid)
Ho: high pressure seawater (concentration target fluid)
Lo: low pressure concentrated seawater (concentrated fluid)

The invention claimed is:

1. A pressure exchange device configured to exchange pressures between a first fluid and a second fluid, comprising:
a rotator configured to rotate about a rotation axis between a first stationary lateral member and a second stationary lateral member, the rotator in which a first flow path, through which the first fluid flows in and out from one end side of the rotator, and a second flow path, through which the second fluid flows in and out from the one end side of the rotator, are arranged around the rotation axis in a direction along the rotation axis;
the second stationary lateral member in which there is formed a communication section configured to communicate with the first flow path and the second flow path and exchange the pressures between the first fluid and the second fluid in the communication section; and
the first stationary lateral member in which a first fluid inflow path configured to guide the first fluid to the first flow path, a second fluid outflow path configured to guide the second fluid, with a pressure that has been exchanged in the communication section for a pressure of the first fluid, from the second flow path, a second fluid inflow path configured to guide the second fluid to the second flow path, and a first fluid outflow path configured to guide the first fluid, with the pressure that has been exchanged in the communication section for the pressure of the second fluid, from the first flow path, are formed in a thickness direction along the rotation axis,
wherein the pressure exchange device further comprises a torque application mechanism configured to apply a torque to the rotator based on an energy of the first fluid that flows into the first flow path or flows out from the first flow path, or an energy of the second fluid that flows into the second flow path or flows out from the second flow path, and wherein the first stationary lateral member includes the torque application mechanism.

2. The pressure exchange device according to claim 1, further comprising a gap in which at least one of the first fluid and the second fluid enters, the gap formed between the rotator and the first stationary lateral member, and the second stationary lateral member; and
a retentive member provided between the first stationary lateral member and the second stationary lateral member to cover the rotator.

3. The pressure exchange device according to claim 1, further comprising a press mechanism configured to press at least one of the first stationary lateral member or the second stationary lateral member and adjust an interval between the first stationary lateral member and the second stationary lateral member.

4. The pressure exchange device according to claim 1, wherein a cross-sectional area of the first flow path and a cross-sectional area of the second flow path in a plane perpendicular to a direction of a flow for the first fluid or second fluid therein are formed to be equal.

5. The pressure exchange device according to claim 1, wherein the first fluid supplied to the first fluid inflow path is a pressurized concentrated fluid discharged from a reverse osmosis membrane device, and the second fluid supplied to the second fluid inflow path is a concentration target fluid supplied to the reverse osmosis membrane device.

6. A pressure exchange device configured to exchange pressures between a first fluid and a second fluid, comprising:
a rotator configured to rotate about a rotation axis between a first stationary lateral member and a second stationary lateral member, the rotator in which a first flow path, through which the first fluid flows in and out from one end side of the rotator, and a second flow path, through which the second fluid flows in and out from the one end side of the rotator, are arranged around the rotation axis in a direction along the rotation axis;

the second stationary lateral member in which there is formed a communication section configured to communicate with the first flow path and the second flow path and exchange the pressures between the first fluid and the second fluid in the communication section;

the first stationary lateral member in which a first fluid inflow path configured to guide the first fluid to the first flow path, a second fluid outflow path configured to guide the second fluid, with a pressure that has been exchanged in the communication section for a pressure of the first fluid, from the second flow path, a second fluid inflow path configured to guide the second fluid to the second flow path, and a first fluid outflow path configured to guide the first fluid, with the pressure that has been exchanged in the communication section for the pressure of the second fluid, from the first flow path, are formed in a thickness direction along the rotation axis; and a press mechanism to press at least one of the first stationary lateral member or the second stationary lateral member and adjust an interval between the first stationary lateral member and the second stationary lateral member and constituted by a first end cover and a second end cover that are respectively arranged on an end surface side, which is different from facing surfaces of the first stationary lateral member and the second stationary lateral member with respect to the rotator, and a coupling member configured to fasten the first end cover to the second end cover, wherein the pressure exchange device further comprises a first enclosed space configured to be partitioned at least by the first stationary lateral member and the first end cover;

a first communication path configured to be formed in the first end cover to guide the first fluid or the second fluid to the first enclosed space;

a second enclosed space configured to be partitioned at least by the second stationary lateral member and the second end cover; and a second communication path configured to be formed in the second stationary lateral member to guide the first fluid or the second fluid to the second enclosed space, and wherein the pressure exchange device further comprises a gap in which at least one of the first fluid and the second fluid enters, the gap formed between the rotator and the first stationary lateral member, and the second stationary lateral member;

a retentive member configured to be provided between the first stationary lateral member and the second stationary lateral member to cover the rotator;

a tubular casing configured to store the retentive member;

an outer circumferential enclosed space configured to be partitioned by the first stationary lateral member, the second stationary lateral member, an outer circumferential surface of the retentive member, and an inner circumferential surface of the casing; and a third communication path configured to be formed in the retentive member, through which a further gap between the rotator and the retentive member, and the outer circumferential enclosed space are allowed to communicate.

7. The pressure exchange device according to claim 6, further comprising a shaft portion configured to be integrally formed with the first stationary lateral member and the second stationary lateral member respectively and rotatably supports the rotator at bilateral end portions of the rotator to protrude on respective facing surface sides of the first stationary lateral member and the second stationary lateral member with respect to the rotator; and a support shaft configured to penetrate the shaft portion, the support shaft having bilateral ends supported by the first stationary lateral member and the second stationary lateral member.

8. The pressure exchange device according to claim 6, wherein the communication section passes through the second stationary lateral member in the thickness direction, and part of the second end cover is constituted of a light transmissive member to enable a visual observation of the rotator through the second end cover.

9. The pressure exchange device according to claim 6, wherein a cross-sectional area of the first flow path and a cross-sectional area of the second flow path in a plane perpendicular to a direction of a flow of the first or second fluid therein are formed to be equal.

10. The pressure exchange device according to claim 9, wherein the first fluid supplied to the first fluid inflow path is a pressurized concentrated fluid discharged from a reverse osmosis membrane device, and the second fluid supplied to the second fluid inflow path is a concentration target fluid supplied to the reverse osmosis membrane device.

11. The pressure exchange device according to claim 6, wherein the first fluid supplied to the first fluid inflow path is a pressurized concentrated fluid discharged from a reverse osmosis membrane device, and the second fluid supplied to the second fluid inflow path is a concentration target fluid supplied to the reverse osmosis membrane device.

12. A pressure exchange device configured to exchange pressures between a first fluid and a second fluid, comprising:

a rotator configured to rotate about a rotation axis between a first stationary lateral member and a second stationary lateral member, the rotator in which a first flow path, through which the first fluid flows in and out from one end side of the rotator, and a second flow path, through which the second fluid flows in and out from the one end side of the rotator, are arranged around the rotation axis in a direction along the rotation axis;

the second stationary lateral member in which there is formed a communication section configured to communicate with the first flow path and the second flow path and exchange the pressures between the first fluid and the second fluid in the communication section;

the first stationary lateral member in which a first fluid inflow path configured to guide the first fluid to the first flow path, a second fluid outflow path configured to guide the second fluid, with a pressure that has been exchanged in the communication section for a pressure of the first fluid, from the second flow path, a second fluid inflow path configured to guide the second fluid to the second flow path, and a first fluid outflow path configured to guide the first fluid, with the pressure that has been exchanged in the communication section for the pressure of the second fluid, from the first flow path, are formed in a thickness direction along the rotation axis;

a press mechanism to press at least one of the first stationary lateral member or the second stationary lateral member and adjust an interval between the first stationary lateral member and the second stationary lateral member and constituted by a first end cover and a second end cover that are respectively arranged on an end surface side, which is different from facing surfaces of the first stationary lateral member and the second stationary lateral member with respect to the rotator, and a coupling member configured to fasten the first end cover to the second end cover, wherein the pressure exchange device further comprises a first pressure area configured to receive the pressure of the first fluid supplied from the first fluid inflow path;

a second pressure area configured to receive the pressure of the second fluid supplied from the second fluid inflow path, wherein the first pressure area and the second pressure area are respectively formed on the end surface side of the first stationary lateral member which is opposite to the rotator, in a facing portion of the first stationary lateral member to the first end cover, a first pressure control area configured to be partitioned in a peripheral area of an opening portion of the first fluid inflow path and in an area corresponding to the first pressure area; and a second pressure control area configured to be partitioned in a peripheral area of an opening portion of the second fluid inflow path and in an area corresponding to the second pressure area.

13. The pressure exchange device according to claim 12, further comprising a third pressure area configured to receive the pressure of the second fluid, in which the pressure has been exchanged for the pressure of the first fluid;

a fourth pressure area configured to receive the pressure of the first fluid, in which the pressure has been exchanged for the pressure of the second fluid, wherein the third pressure area and the fourth pressure area are respectively formed on the end surface side of the first stationary lateral member which is opposite to the rotator, and in the facing portion of the first stationary lateral member to the first end cover, a third pressure control area configured to be partitioned in a peripheral area of the opening portion of the second fluid outflow path and in an area corresponding to the third pressure area; and a fourth pressure control area configured to be partitioned in the peripheral area of the opening portion of the first fluid outflow path and in an area corresponding to the fourth pressure area.

14. The pressure exchange device according to claim 13, further comprising an intermediate pressure area configured to be formed between the first pressure area and the third pressure area, and the second pressure area and the fourth pressure area; and an intermediate pressure control area configured to be partitioned between the first pressure control area and the third pressure control area, and the second pressure control area and the fourth pressure control area, in the facing portion of the first stationary lateral member to the first end cover.

15. The pressure exchange device according to claim 14, further comprising a communication path configured to guide a fluid in the intermediate pressure area to the intermediate pressure control area.

16. The pressure exchange device according to claim 13, further comprising a fifth pressure area configured to receive the pressure of the first fluid supplied from the first fluid inflow path and the pressure of the second fluid, in which the pressure has been exchanged for the pressure of the first fluid;

a sixth pressure area configured to receive the pressure of the second fluid supplied from the second fluid inflow path and the pressure of the first fluid, in which the pressure has been exchanged for the pressure of the second fluid;

a seventh pressure area configured to receive an intermediate pressure between the pressure of the first fluid supplied from the first fluid inflow path and the pressure of the second fluid supplied from the second fluid inflow path, between the fifth pressure area and the sixth pressure area, wherein the fifth pressure area, the sixth pressure area, and the seventh pressure area are formed on the end surface side of the second stationary lateral member which is opposite to the rotator, and in a facing portion of the second end cover to the second stationary lateral member, a fifth pressure control area configured to be partitioned in an area corresponding to the fifth pressure area;

a sixth pressure control area configured to be partitioned in an area corresponding to the sixth pressure area; and a seventh pressure control area configured to be partitioned in an area corresponding to the seventh pressure area.

17. The pressure exchange device according to claim 16, further comprising a communication path configured to guide the fluid in the seventh pressure area to the seventh pressure control area.

18. A pressure exchange device configured to exchange pressures between a first fluid and a second fluid, comprising:

a rotator configured to rotate about a rotation axis between a first stationary lateral member and a second stationary lateral member, the rotator in which a first flow path, through which the first fluid flows in and out from one end side of the rotator, and a second flow path, through which the second fluid flows in and out from the one end side of the rotator, are arranged around the rotation axis a direction along the rotation axis;

the second stationary lateral member in which there is formed a communication section configured to communicate with the first flow path and the second flow path and exchange the pressures between the first fluid and the second fluid in the communication section;

the first stationary lateral member in which a first fluid inflow path configured to guide the first fluid to the first flow path, a second fluid outflow path configured to guide the second fluid, with a pressure that has been exchanged in the communication section for a pressure of the first fluid, from the second flow path, a second fluid inflow path configured to guide the second fluid to the second flow path, and a first fluid outflow path configured to guide the first fluid, with the pressure that has been exchanged in the communication section for the pressure of the second fluid, from the first flow path, are formed in a thickness direction along the rotation axis;

a gap that the first fluid and the second fluid enter, the gap formed between the rotator and the first stationary lateral member, and the second stationary lateral member;

a retentive member configured to be provided between the first stationary lateral member and the second stationary lateral member to cover the rotator;

a bearing portion comprising an inner circumferential surface of the retentive member and an outer circumferential surface of the rotator and configured to rotatably support the rotator, wherein the pressure exchange device further comprises a first end cover and a second end cover configured to be respectively arranged on an end surface side of the first stationary lateral member and the second stationary lateral member which is different from facing surfaces thereof with respect to the rotator;

a support shaft configured to be inserted in an insertion portion which passes through a central portion of the rotator along the rotation axis and is configured to be installed such that end portions thereof are respectively positioned in a first enclosed space partitioned by the first stationary lateral member and the first end cover, and in a second enclosed space partitioned by the second stationary lateral member and the second end cover; and a plurality of communication paths comprising a communication path to communicate with the first enclosed space and the insertion portion; and another communication path to communicate with the second enclosed space and the insertion portion.

19. The pressure exchange device according to claim 18, wherein the communication section passes through the second stationary lateral member in the thickness direction along the rotation axis, and part of the second end cover is constituted of a light transmissive member to enable a visual observation of the rotator through the second end cover.

20. The pressure exchange device according to claim 18, further comprising a first pressure area configured to receive the pressure of the first fluid supplied from the first fluid inflow path;

a second pressure area configured to receive the pressure of the second fluid supplied from the second fluid inflow path, wherein the first pressure area and the second pressure area are respectively formed on the end surface side of the first stationary lateral member which is opposite to the rotator, and in a facing portion of the first stationary lateral member to the first end cover, a first pressure control area configured to be partitioned in a peripheral area of an opening portion of the first fluid inflow path and in an area corresponding to the first pressure area; and a second pressure control area configured to be partitioned in a peripheral area of an opening portion of the second fluid inflow path and in an area corresponding to the second pressure area.

21. The pressure exchange device according to claim 20, further comprising a third pressure area configured to receive the pressure of the second fluid, in which the pressure has been exchanged for the pressure of the first fluid;

a fourth pressure area configured to receive the pressure of the first fluid, in which the pressure has been exchanged for the pressure of the second fluid, and wherein the third pressure area and the fourth pressure area are respectively formed on the end surface side of the first stationary lateral member which is opposite to the rotator; and in the facing portion of the first stationary lateral member to the first end cover, a third pressure control area configured to be partitioned in a peripheral area of the opening portion of the second fluid outflow path and in an area corresponding to the third pressure area; and a fourth pressure control area configured to be partitioned in a peripheral area of the opening portion of the first fluid outflow path and in an area corresponding to the fourth pressure area.

22. The pressure exchange device according to claim 21, further comprising an intermediate pressure area configured to be formed between the first pressure area and the third pressure area, and the second pressure area and the fourth pressure area; and an intermediate pressure control area configured to be partitioned between the first pressure control area and the third pressure control area, and the second pressure control area and the fourth pressure control area, in the facing portion of the first stationary lateral member to the first end cover.

23. The pressure exchange device according to claim 22, wherein the plurality of communication paths further comprise a communication path configured to guide a fluid in the intermediate pressure area to the intermediate pressure control area.

24. The pressure exchange device according to claim 21, further comprising a fifth pressure area configured to receive the pressure of the first fluid supplied from the first fluid inflow path and the pressure of the second fluid, in which the pressure has been exchanged for the pressure of the first fluid;

a sixth pressure area configured to receive the pressure of the second fluid supplied from the second fluid inflow path and the pressure of the first fluid, in which the pressure has been exchanged for the pressure of the second fluid;

a seventh pressure area configured to receive an intermediate pressure between the pressure of the first fluid supplied from the first fluid inflow path and the pressure of the second fluid supplied from the second fluid inflow path, between the fifth pressure area and the sixth pressure area, wherein the fifth pressure area, the sixth pressure area, and the seventh pressure area are formed on the end surface side of the second stationary lateral member which is opposite to the rotator, and in a facing portion of the second end cover to the second stationary lateral member, a fifth pressure control area configured to be partitioned in an area corresponding to the fifth pressure area;

a sixth pressure control area configured to be partitioned in an area corresponding to the sixth pressure area; and a seventh pressure control area configured to be partitioned in an area corresponding to the seventh pressure area.

25. The pressure exchange device according to claim 24, wherein the plurality of communication paths further comprise a communication path configured to guide the fluid in the seventh pressure area to the seventh pressure control area.

* * * * *